US009141391B2

(12) United States Patent
Tran et al.

(10) Patent No.: US 9,141,391 B2
(45) Date of Patent: *Sep. 22, 2015

(54) DATA PROCESSING SYSTEM WITH LATENCY TOLERANCE EXECUTION

(75) Inventors: Thang M. Tran, Austin, TX (US); Trinh Huy Nguyen, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 743 days.

This patent is subject to a terminal disclaimer.

(21) Appl. No.: 13/419,531

(22) Filed: Mar. 14, 2012

(65) Prior Publication Data

US 2012/0303936 A1 Nov. 29, 2012

Related U.S. Application Data

(63) Continuation-in-part of application No. 13/116,325, filed on May 26, 2011, now Pat. No. 8,904,150.

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC ............ *G06F 9/3824* (2013.01); *G06F 9/3826* (2013.01); *G06F 9/3836* (2013.01); *G06F 9/3838* (2013.01); *G06F 9/3851* (2013.01)

(58) Field of Classification Search
None
See application file for complete search history.

(56) References Cited

U.S. PATENT DOCUMENTS

| 5,699,537 | A | 12/1997 | Sharangpani et al. |
| 5,925,122 | A | 7/1999 | Ohsawa |
| 5,941,983 | A * | 8/1999 | Gupta et al. .................. 712/214 |
| 6,553,482 | B1 * | 4/2003 | Witt .............................. 712/216 |
| 6,931,641 | B1 | 8/2005 | Davis et al. |
| 8,365,015 | B1 | 1/2013 | Yu et al. |
| 2004/0064829 | A1 | 4/2004 | Pallister et al. |
| 2004/0215632 | A1 | 10/2004 | Isip et al. |
| 2004/0216101 | A1 | 10/2004 | Burky et al. |
| 2006/0218124 | A1 | 9/2006 | Williamson et al. |
| 2007/0028078 | A1 | 2/2007 | Harris et al. |
| 2010/0250900 | A1 | 9/2010 | Brown et al. |

OTHER PUBLICATIONS

Mukherjee et al. (Detailed Design and Evaluation of Redundant Multithreading Alternatives, May 2002, pp. 99-110).*
Bai et al.; "A Dynamically Reconfigurable Mixed In-Order/Out-of-Order Issue Queue for Power Aware Microprocessors"; IEEE Computer Society Annual Symposium Proceedings, VLSI; Feb. 20-21, 2003; pp. 139-146; IEEE.

(Continued)

*Primary Examiner* — George Giroux

(57) ABSTRACT

In a processor having an instruction unit, a decode/issue unit, and execution queues configured to provide instructions to correspondingly different types execution units, a method comprises maintaining a duplicate free list for the execution queues. The duplicate free list includes a plurality of duplicate dependent instruction indicators that indicate when a duplicate instruction for a dependent instruction is stored in at least one of the execution queues. One of the duplicate dependent instruction indicators is assigned to an execution queue for a dependent instruction. The dependent instruction is executed only when the one of the duplicate dependent instruction indicators is reset.

18 Claims, 12 Drawing Sheets

(56) References Cited

OTHER PUBLICATIONS

Raasch et al.; "A Scalable Instruction Queue Design Using Dependence Chains"; Proceedings of the 29th Annual International Symposium on Computer Architecture; 2002; pp. 318-329; IEEE Computer Society.

Smotherman; "Eager Execution/Dual Path/Multiple Path"; http://www.cs.clemson.edu/~mark/eager.html; Jul. 2010; 8 Pgs.; Clemson School of Computing.

U.S. Appl. No. 13/036,251, filed Feb. 28, 2011.
U.S. Appl. No. 13/210,566, filed Aug. 16, 2011.
U.S. Appl. No. 13/212,420, filed Aug. 18, 2011.
U.S. Appl. No. 13/397,452, filed Feb. 15, 2012.
U.S. Appl. No. 13/116,325, Tran, Thang, "Microprocessor Systems and Methods for Handling Instructions With Multiple Dependencies", filed May 26, 2011, Office Action—Notice of Allowance, mailed Jun. 20, 2014.

* cited by examiner

| SRC0 | SRC0 VALID | SRC0 DEPEND | SRC1 | SRC1 VALID | SRC1 DEPEND | DST | DST VALID | ITYPE | VALID | LSCNT | PEND | TAGS | 1-HOT DUPLICATE |

FIG. 3

| 1-HOT DUPLICATE | THIS FIELD INDICATES MULTIPLE COPIES OF THE INSTRUCTIONS EXISTED IN DIFFERENT EXECUTION QUEUES OR STATUS BIT DEPENDENCY<br><br>• STATUS_DUPLICATE: CAN BE EITHER READ OR WRITE, (1) WRITE - WHEN EXECUTE WILL BE USED TO CLEAR THE STATUS_DUPLICATE IN OTHER QUEUES (2) READ - WAIT FOR STATUS RESULT FROM THE WRITE INSTRUCTION FROM ANOTHER QUEUE TO CLEAR THE STATUS_DUPLICATE BIT.<br>• SYNC_DUPLICATE: CAN EITHER BE DUMMY OR PENDING (1) DUMMY - WHEN THIS INSTRUCTION IS AT THE BOTTOM OF THE QUEUE, THE SYNC_DUPLICATE WILL BE USED TO CLEAR THE SYNC_DUPLICATE OF OTHER PENDING INSTRUCTION IN OTHER EXECUTION QUEUES (2) PENDING - WAIT FOR DUMMY INSTRUCTION FORM ANOTHER QUEUE TO CLEAR THE SYNC_DUPLICATE BIT(S).<br>• DUPLICATE: INSTRUCTIONS ARE SENT TO MULTIPLE QUEUES WITH DUPLICATE BIT(S) SET, THE FIRST DUPLICATE INSTRUCTION AT BOTTOM OF QUEUE WILL CLEAR THE DUPLICATE BIT(S) OF ANOTHER QUEUE. INSTRUCTION CAN ONLY BE EXECUTED IF NO DUPLICATE BIT IS SET. |

FIG. 4

| PEND | INSTRUCTION IS PENDING ON CONDITION EXECUTION:
|---|---|
| | - RESULT_PENDING: INSTRUCTION HAS BEEN SENT TO LOAD/STORE EXECUTION UNIT AND IS WAITING FOR RESULT DATA THAT IS READY IN NEXT CLOCK CYCLE.
| | - CA_PENDING: INSTRUCTION WITH CARRY-IN, WAITING FOR CARRY BIT TO BE FORWARDED FROM OTHER EXECUTION QUEUE.
| | - CR_PENDING: INSTRUCTION WITH CR INPUT, WAITING FOR CR RESULT TO BE FORWARDED FROM OTHER EXECUTION QUEUE. THIS BIT MAY BE COMBINED WITH CA_PENDING UNLESS THERE IS AN INSTRUCTION THAT NEEDS BOTH PENDING BITS.
| | - SYNC_PENDING (1 BIT): INSTRUCTION IS WAITING FOR RESULTS FROM OTHER EXECUTION QUEUES.
| | - CA_WRITE: INSTRUCTION WILL WRITE TO CARRY BIT
| | - CR_WRITE: INSTRUCTION WILL WRITE TO CR

DATA PROCESSING SYSTEM WITH LATENCY TOLERANCE EXECUTION

RELATED APPLICATION

This application is a continuation-in-part of U.S. patent application Ser. No. 13/116,325, filed on May 26, 2011, entitled "Microprocessor Systems and Methods for Handling Instructions with Multiple Dependencies," naming Thang M. Tran and Leick D. Robinson as inventors, and assigned to the current assignee hereof, and which is hereby incorporated by reference.

BACKGROUND

1. Field

This disclosure relates generally to data processing systems, and more specifically, to configuring a data processing system for latency tolerance execution.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

FIG. 3 is a diagram of an embodiment of an execution queue entry in the processor of FIG. 2 in accordance with one embodiment of the present disclosure.

FIGS. 4 and 5 are diagram of the 1-HOT DUPLICATE and PEND fields of the execution queue entry of FIG. 3 in accordance with one embodiment of the present disclosure.

DETAILED DESCRIPTION

In one embodiment, a data processing system uses a number of execution queues in which decoded instructions are issued to the queues and the instructions in each execution queue are executed in order but the instructions from different execution queues can execute out-of-order. If an instruction has a dependency on another instruction already present in a queue, the instruction is placed in the same queue. Furthermore, since the instruction may have 2 source operands, the instruction can be sent to multiple queues. In this case, a set of 1-hot duplicate bits may be used to keep track of duplicate instructions which reside in the queues. This methodology is further described in U.S. patent application Ser. No. 13/116, 325. Also, for dependent instructions of different types, a sync instruction can be sent to the queue holding the instruction on which it depends, while the actual instruction is sent to the queue of the same type. In this case, in accordance with an embodiment of the disclosure, a set of 1-hot sync duplicate bits may also be used to keep track of any sync instructions. Furthermore, there are instructions which update one or more status bits, and instructions which source one or more status bits. In one example, the status bit may be a carry bit. A set of 1-hot status duplicate bits, in accordance with an embodiment of the disclosure, may also be used to keep track of the updating and reading of a status bit. Furthermore, a duplicate free list may include a set of duplicate dependent instruction indicators to manage the 1-hot duplicate bits, 1-hot sync duplicate bits, and the 1-hot status duplicate bits. Use of a set of 1-hot bits and the duplicate free list to handle these additional situations will be further understood in reference to the figures described below.

Figure 1:
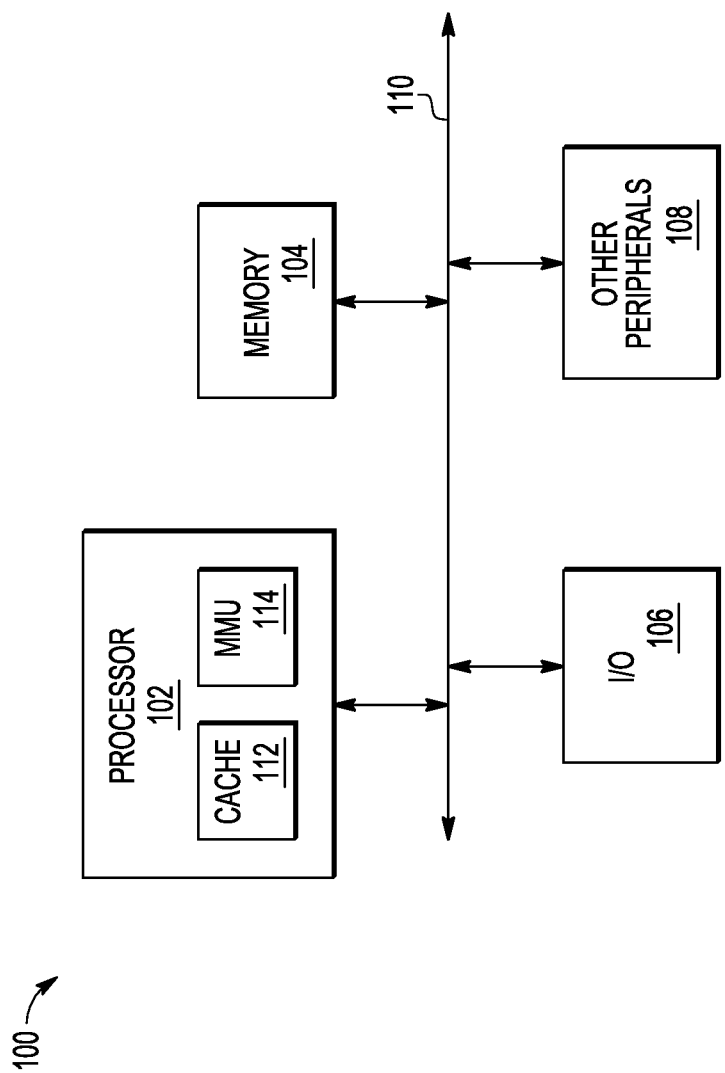
FIG. 1 is a diagram of an embodiment of a data processing system in accordance with one embodiment of the present disclosure.

FIG. 1 shows a data processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order. At comparable performance points, system 100 has the lower power and area requirements than systems that use only out-of-order execution queues.

In the illustrated embodiment, components in data processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to data processing system 100. Alternate embodiments of the present disclosure may use more, less, or different components and functional blocks that those illustrated in FIG. 1. As some possible examples, alternate embodiments of data processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, data processing system 100 may include one, two, or any number of processors 102. If a plurality of processors 102 are used in data processing system 100, any number of them may be the same, or may be different. Note that although data processing system 100 may have a plurality of processors 102, a single processor 102 may itself execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
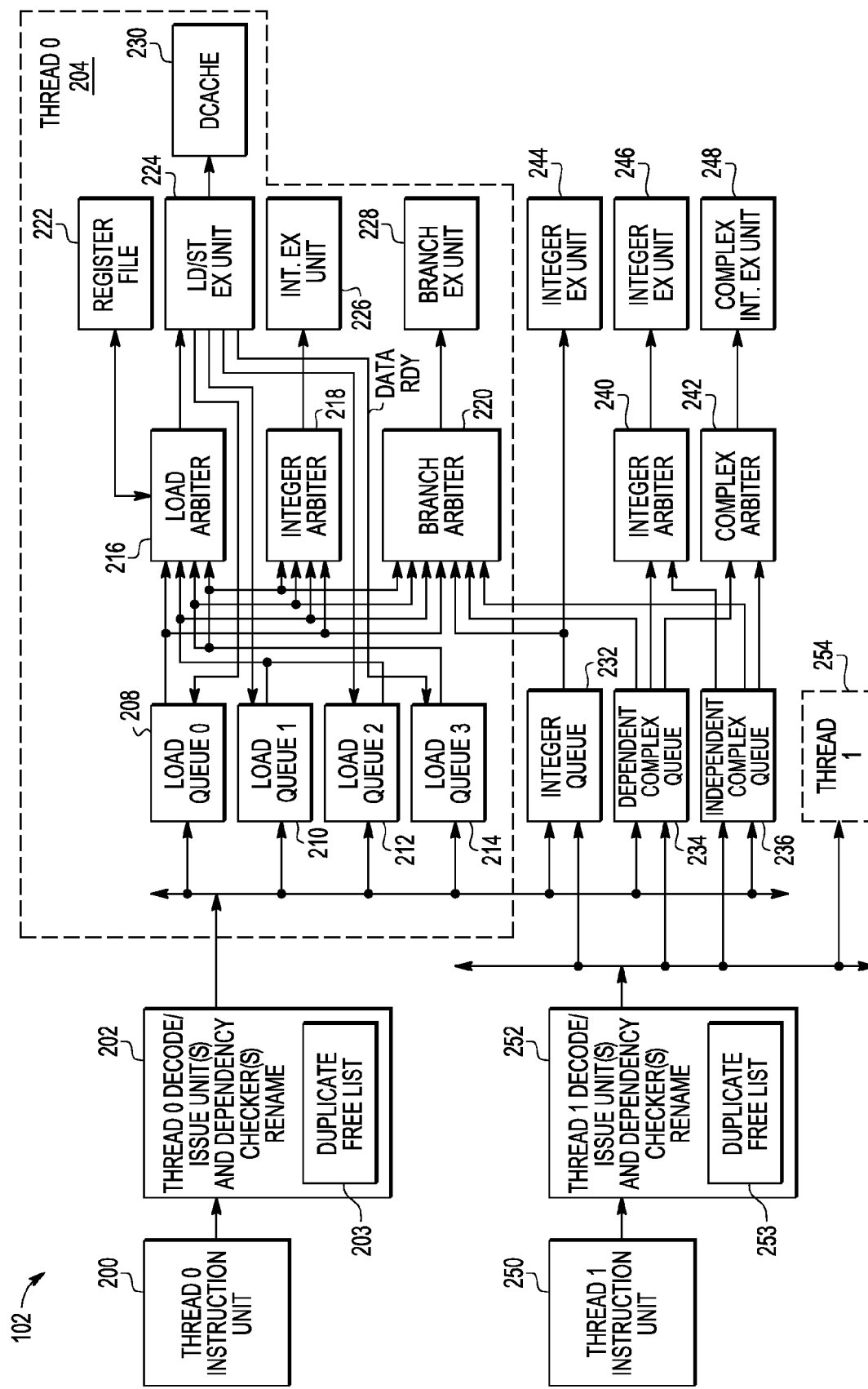
FIG. 2 is a diagram of an embodiment of instruction handling components that can be included in the processor of FIG. 1 in accordance with one embodiment of the present disclosure.

FIG. 2 is a diagram of an embodiment of instruction handling components that can be included in processor 102 of FIG. 1 with latency tolerance execution of one or more program threads (e.g., Thread0 and Thread1). Thread0 and Thread1 instruction units 200, 250 implement instruction queues configured to provide program instructions to respective decode units 202, 252. Decode units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions. Decode units 202, 252 also include duplicate free lists 203, 253. Duplicate free lists 203, 253 may also include, as will be described below a carry pending valid bit and a carry pending pointer which indicates a location with the duplicate free list. In order to simplify the descriptions herein, operation of processor 102 will be described in reference to the carry bit as an example status bit; however, similar descriptions would apply to other status bits or groups of status bits (such as, for example, conditions within a condition register, such as greater than zero, less than zero, equal to zero, or overflow). Note also that duplicate free lists 203, 253 may also include any control logic, as needed, to write to or update and read from or use the duplicate free list, and to otherwise control their operation.

Decode units 202, 252 issue instructions to execution queues, and update register renaming for issued instructions. In the embodiment shown, a group of components 204 in processor 102 allocated to Thread0 includes load queues 208, 210, 212, 214, integer queue 232, and complex integer queues 234, 236. Another group of components 254 in processor 102 allocated to Thread1 includes a separate set of load queues 208-214, while integer queue 232 and complex integer queues 234, 236 can be shared by Thread0 and Thread1. Note each of the load queues, integer queues, dependent complex queues, and independent complex queues can be referred to generically as execution queues.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, register file 222, load/store unit 224, integer execution unit 226, branch execution unit 228, and data cache 230.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and complex integer queues 234, 236. Integer arbiter 240 and complex arbiter 242 can each arbitrate integer instructions from complex integer queues 234, 236.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 includes multiple load queues 208-214 to hold the dependent instructions that experience a cache miss in the same queue until completion instead of replaying or re-issuing instructions while independent instructions are free to issue from other execution queues. Additionally, when an instruction issues, since the instructions in queues 208-214 can be in-order, data for source operands will be available from result forwarding or from register file 222. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 208-214. The dependent instruction in one of queues 208-214 will then be invalidated when the copy of the instruction reaches the head of another of queues 208-214.

Furthermore, some instructions, such as arithmetic logic unit (ALU) instructions, conditional instructions, or logic instructions, may be dependent upon (e.g. generate and/or use) one or more status bits. This one or more status bit may be, for example, a carry bit, a condition register bit (e.g. a greater than zero bit, a less than zero bit, an equal to zero bit, an overflow bit etc.), or any grouping thereof. For example, an "Addc" processor instruction may generate a carry bit, while an "Adde" processor instruction may use a previously generated carry bit as a third source operand for the addition.

In single thread mode, processor 102 can concurrently send two instructions to decode unit 202 and one instruction to decode unit 252 resulting in execution of three instructions per cycle. In multi-thread mode, two threads can concurrently send two instructions each to decode units 202, 252 resulting in execution of two instructions per cycle per thread. Decode units 202, 252 can also handle issuing serialize instructions such as instruction exceptions (e.g., Translation Look-aside Buffer miss, breakpoint, and illegal instruction), software interrupts (SWI), and instructions that modify processor configuration and states.

Load arbiter 216 sends instructions to load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and complex integer queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle. Load/store unit 224 can send data ready signals to load queues 208-214 when a cache hit is detected from data cache 230. The bottom entries of load queues 208-214 can send an entry or tag that includes time stamp information to load arbiter 216. The time stamp information allows load arbiter 216 to determine and send the oldest instruction to load/store unit 224. Alternatively, load/store arbiter 216 can receive and send instructions on a round robin basis, where the first instruction that reaches arbiter 216 is the first instruction sent to load/store unit 224. The round robin basis is matched by decode units 202, 252 for issuing independent load/store instructions to load queues 208-214.

FIG. 3 is a diagram of an embodiment of an execution queue entry 300 that can be used for instructions in computer processor 102 of FIG. 1 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | instruction has been sent to execution unit and is waiting for data that is ready to be sent in the next clock cycle |
| TAGS | Keeps track of instruction ordering during execution |
| 1-HOT DUPLICATE | Indicates multiple copies of the instructions exist in different execution queues or indicates status bit dependency |

Other suitable fields and tags can be used in entries 300 in addition to or instead of the fields/tags shown hereinabove. Entries 300 can be used by decoder unit 202, load queues 208-214, and arbiters 216, 218, 220, 240, 242 to keep track of instructions. The fields/tags can be used as signals or indicators in processor 102 and methods performed therein.

FIG. 4 expands upon the 1-HOT DUPLICATE field 304 of entry 300. 1-HOT DUPLICATE 304 indicates multiple copies of the instructions existed in different execution queues or status bit dependency. The following fields may be included within 1-HOT DUPLICATE 304: status_duplicate, sync_duplicate, and duplicate. The descriptions of each of these fields is provided in FIG. 4. The status_duplicate field, which may also be referred to as the 1-HOT STATUS DUPLICATE field or the duplicate status bit indicator, or, in the case in which the status bit is the carry bit, may also be referred to as the 1-HOT CARRY DUPLICATE field, can either represent a read or write. In the case of a write to a status bit (e.g. carry bit), when the corresponding instruction of the entry is executed, this field is used to clear the status_duplicate field in other queues. In the case of a read from a status bit (e.g. carry bit), the corresponding instruction of the entry waits for a status result from a write instruction which updates the status result from another queue to clear this status_duplicate bit. The sync_duplicate field, which may also be referred to as the 1-HOT SYNC DUPLICATE field or the duplicate synchronization instruction indicator, can either represent a sync instruction (i.e. a dummy instruction) or a pending instruction. In the case of a sync instruction, when the corresponding instruction of the entry is at the bottom of the queue, this sync_duplicate field will be used to clear the sync_duplicate field of other pending instructions in other execution queues. In the case of a pending instruction, the corresponding instruction of the entry waits for the sync instruction (i.e. dummy instruction) from another queue to clear this sync_duplicate bit. With respect to the duplicate field (which may also be referred to as the duplicate instruction indicator), instructions which are sent to multiple queues are sent with one or more duplicate bits of this duplicate field set. The first duplicate instruction which reaches the bottom entry of a queue will clear one or more duplicate bits of another queue. An instruction is ready for execution only if no corresponding duplicate bit is set.

PEND 302 provides information as to whether the corresponding instruction is pending on condition execution. The following fields may be stored within PEND 302: RESULT_PENDING; CA_PENDING; CR_PENDING; SYNC_PENDING; CA_WRITE; and CR_WRITE. The CA_PENDING field indicates that the corresponding instruction has a carry-in (thus uses a carry bit as an additional source operand), and is waiting for the carry bit to be forwarded from another execution queue (as a result of execution of the appropriate instruction which generates the carry bit). The CR_PENDING field indicates that the corresponding instruction has a CR input (thus uses a condition bit from the condition register as an additional source operand), and is waiting for the CR result to be forwarded from another execution queue (as a result of execution of the appropriate instruction which generates the condition result). The SYNC_PENDING field indicates that the corresponding instruction is waiting for results from other execution queues. The CA_WRITE field indicates whether or not the corresponding instruction will write or generate a carry bit. The CR_WRITE field indicates whether the corresponding instruction will write to the condition register (CR). These values for CA_WRITE and CR_WRITE can be provided by decode unit 202 when storing an instruction into an execution queue.

With reference to FIGS. 2, 3, and 4, when a first instruction is saved to a selected queue 208-214, 232-236, a dependency indicator (SRC0_DEPEND, SRC1_DEPEND) for each corresponding operand of the first instruction can be stored in entries 300 to indicate whether or not the corresponding operand depends on a second instruction that immediately precedes the first instruction within the selected queue. When the dependency indicator for the corresponding operand indicates that it does depend on the second instruction, execution units 224-228, 244-248 can feed forward the resulting data of the second instruction for the corresponding operand for use in executing the first instruction. When the dependency indicator (SRC0_DEPEND, SRC1_DEPEND) for the corresponding operand indicates that it does not depend on the second instruction, execution units 224-228, 244-248 can obtain data from register file 222 for the corresponding operand for use in executing the first instruction.

In some embodiments, when load arbiter 216 selected selects a first instruction for execution by the load/store execution unit 224 and dependency indicator (SRC0_DEPEND, SRC1_DEPEND) for the corresponding operand indicates that it does depend on a second instruction, load/store execution unit 224 feeds forward the resulting data of the second instruction for the corresponding operand for use in executing the first instruction. When the first instruction is selected by load arbiter 216 for execution by load/store execution unit 224 and the dependency indicator for the corresponding operand indicates that it does not depend on the second instruction, load/store execution unit 224 obtains data from register file 222 for the corresponding operand for use in executing the first instruction.

In some embodiments, instructions stored in load queues 208-214 have a corresponding pending indicator (RESULT_PENDING in PEND 302) which indicates whether the instruction is available for selection by load arbiter 216 when the instruction appears in a bottom entry of the load queue.

Figure 6:
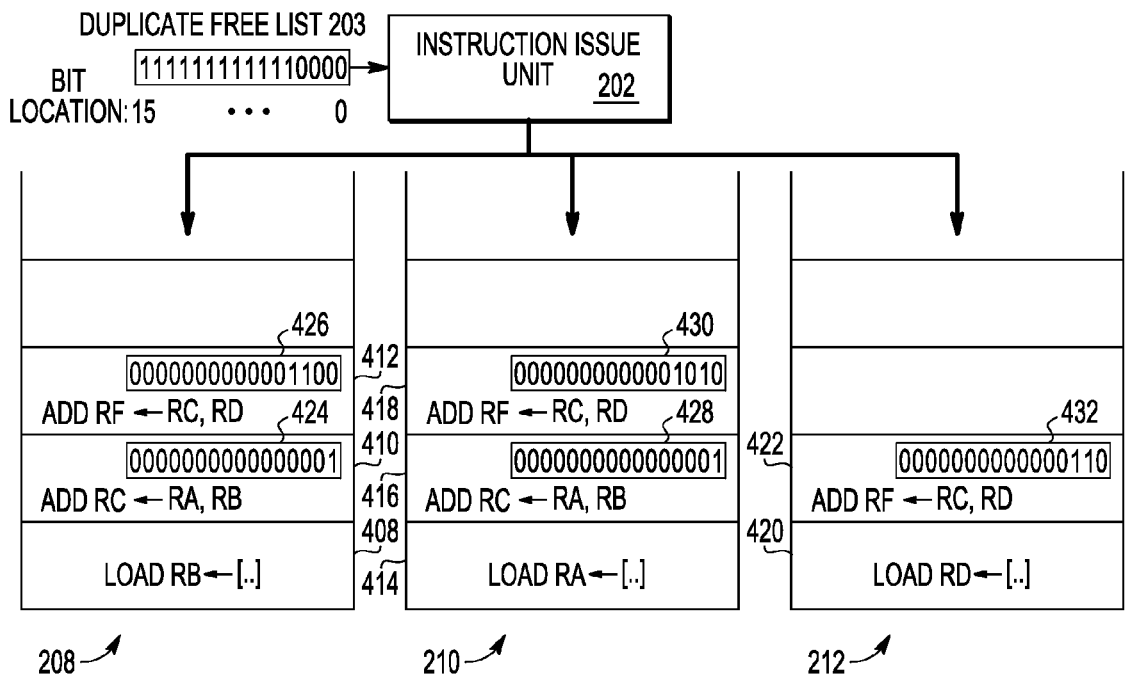
FIGS. 6-13 are diagrams of examples of instruction handling at various different points in time of the data processor of FIG. 2.
Figure 7:
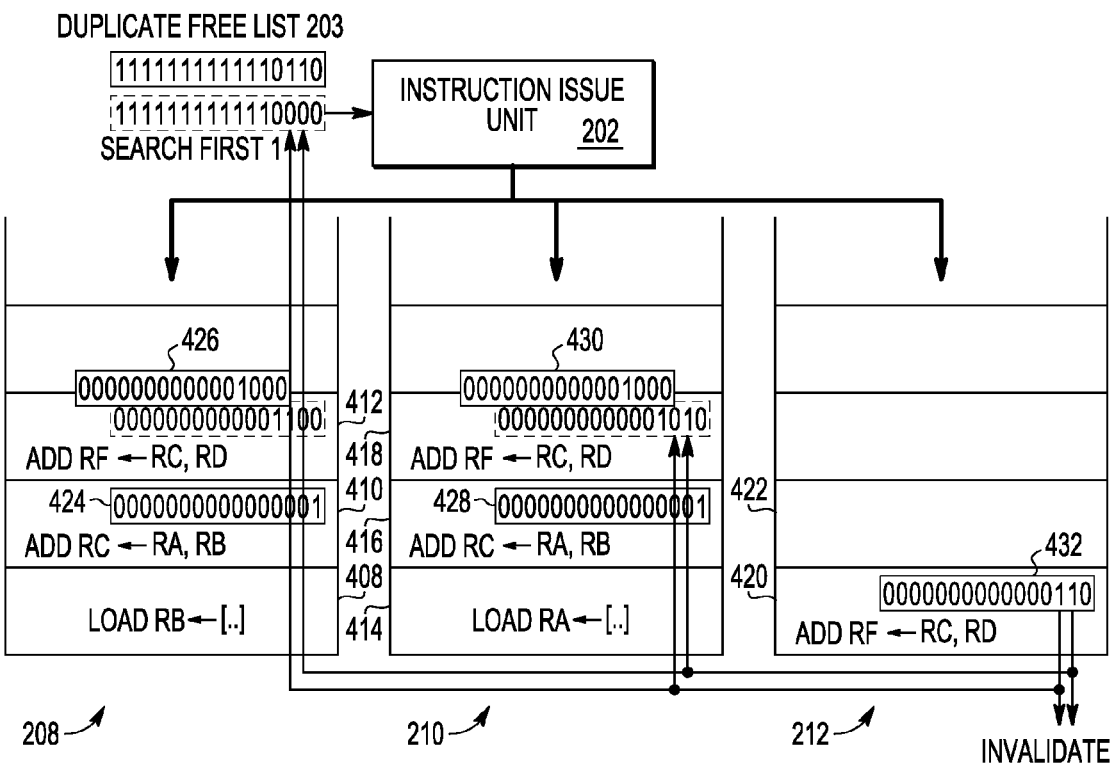

FIGS. 6 and 7 illustrate diagrams of an example instruction handling using the duplicate field of 1-HOT DUPLICATE field 304. In the example of FIGS. 6 and 7, the following example instruction sequence is assumed:

Load RBF←[..]
Load RA←[..]
Load RDF←[..]
Add RC←RA, RB
Add RF←RC, RD

In the instruction examples herein, note the first register reference of the Load or Add instruction (on the left side of the arrow) refers to the destination register of the instruction (the general purpose register (GPR) to which the result of the add instruction will be stored), and the second and third register references refer to the source registers of the add instructions (the general purpose registers which store the sources of the add instruction). Note that the denotation "RX", in which X can be any letter, represents a particular register in the GPR.

Also illustrated in FIGS. 6 and 7 is duplicate free list 203, instruction issue unit 202, and load queues 208, 210, and 212 (which may also be referred to as instruction execution queues). Entry 408 is the bottom entry of load queue 208, and entries 410 and 412 are the next two subsequent entries of load queue 208. Entry 414 is the bottom entry of load queue 210, and entries 416 and 418 are the next two subsequent entries of load queue 210. Entry 410 is the bottom entry of load queue 212, and entry 422 is the next subsequent entry of load queue 212. In the illustrated example, instruction issue unit dispatches instructions to queues 208, 210, and 212, and those instructions at the bottom entry of each queue, upon being ready for execution, may be selected by an arbiter for execution (e.g. by load arbiter 216, integer arbiter 218, or branch arbiter 220, based on the instruction type of the bottom entry). Also, each instruction in the queues 208, 210 and 212 may have the format of entry 300 of FIG. 3. In the examples of FIGS. 6 and 7, for each instruction in each entry of a queue, a representation of the corresponding duplicate field of 1-HOT DUPLICATE field 304 is provided.

Referring to FIG. 6, instruction unit 202 has previously dispatched the load RB instruction to queue 208, the load RA instruction to queue 210, and the load RD instruction to queue 212. They are currently stored in entries 408, 414, and 420, respectively. Also, instruction unit 202 has dispatched the Add RC instruction to queues 208 and 210. Since the Add RC instruction uses RA and RB as source registers, this instruction is dependent on both the Load RB instruction and the Load RA instruction. Therefore, it is dispatched to the same queues as load RB and load RA, and are stored in subsequent entries to the load instructions, respectively. Currently, they are stored in entries 410 and 416, respectively. However, since duplicate instructions were dispatched (i.e. the add RC instruction was sent to multiple queues), one bit of the duplicate field of each multiple instruction is asserted to a logic level 1. Therefore, duplicate field 424 of the Add RC instruction in queue 208 and duplicate field 428 of the Add RC instruction in queue 210 have a single bit asserted to indicate that the instructions are duplicates. Also, a first bit in duplicate free list 203 is negated to a logic level 0 to indicate that that bit location is in use by instructions within the instruction execution queues. Note that the first bit location, from right to left, of duplicate free list may be referred to bit location 0, in which bit locations are numbered increasing order to the left until bit location 15. That is, in the current example, duplicate free list 203 is a 16 bit value which allows for the use of 16 bits. Therefore, each duplicate field of an instruction within the 1-HOT duplicate field 304 is also 16 bits. Also, note that each bit in duplicate free list 203 may also be referred to as a duplicate dependent instruction indicator.

The instruction unit 202 then dispatches the Add RF instruction to queues 208, 210, and 212. Since this add instruction uses RC and RD as source registers, this instruction is dependent on three instructions already present in the queues: each of the RC instructions in queues 208 and 210, and the load RD instruction in queue 212. Therefore, it is dispatched into subsequent entries of each queue. Currently, it is stored into entries 412, 418, and 422. In this case, the Add RF instruction is not duplicated but triplicated. In the case of a triplicated instruction, 3 bits of the duplicate field are used to indicate the triplication of the instruction. Therefore, since duplicate free list 203 indicates that bit location 0 is already in use by another instruction (e.g. the duplicated Add RC instruction in this case), the next 3 bit locations (bit locations 1-3) are used. Therefore, these 3 bit locations of duplicate free list 203 are negated to a logic level 0, and in the duplicate fields of each Add RF instruction (fields 426, 430, and 432) are set accordingly. The same 3 bit locations (bit locations 1-3) in each field are used to store a distinct 3-bit value: 110 in duplicate field 426, 101 in duplicate field 430, and 011 in duplicate field 432. Therefore, note that a duplicated instruction requires the use of one bit whereas a triplicated instruction requires the use of 3 bits. Furthermore, for a duplicate instruction, only a single bit position of the duplicate field of each duplicate instruction is a logic level one. Similarly, for a triplicate instruction, only two bit positions of the duplicate field of each triplicate instruction is a logic level one. Therefore, for a triplicate instruction, a 3 bit value of 111 is not used. That is, the number of bit positions at a logic level 1 in each duplicate field indicates how many other "copies" of the instruction exist elsewhere in the queues.

Referring to FIG. 7, FIG. 7 illustrates the queues of FIG. 6 at a later point in time. In the example of FIG. 7, solid line fields indicate new values and the dotted line fields are used to indicate the previous value. In FIG. 7, the Load RD instruction has been selected for execution by a load arbiter and removed from queue 212. All other instructions are then shifted down, such that the Add RF instruction is now in bottom entry 420 of queue 212. Note that for an instruction in a bottom entry of a queue to be ready for selection by an arbiter for execution, its duplicate field must be clear (all logic level zeros). Otherwise, it indicates that its duplicate or triplicate counterparts are still waiting for a dependency to be resolved. Therefore, once the Add RF instruction reaches bottom entry 420 with a non-zero duplicate field, it is invalidated, and the non-zero duplicate field is used to modify the duplicate fields of the other Add RF instructions. A logic level one in a particular bit location of duplicate field 432 is used to update clear the value of the corresponding bit location of duplicate fields 430 and 426 of the other instantiations of the Add RF instruction. Therefore, since bit locations 1 and 2 of duplicate field 432 are logic level ones, bit locations 1 and 2 of each of duplicate fields 430 and 426 are clear to zero, leaving only one bit position at a logic level one. This is because the remaining Add RF instructions are duplicates and no longer triplicates. This also frees up bit locations for use by other instructions. Therefore, bit locations 1 and 2 of duplicate free list 203 are updated to logic level ones to indicate that they are free for use again. The Add RF instruction has thus been invalidated and can be removed from queue 212 as well.

Whichever of the remaining two Add RF instructions is the first Add RF instruction to reach a bottom entry of a queue, it's duplicate field will be used to clear the duplicate field of the last remaining instruction such that the duplicate field of the last remaining instruction will be zero. The first Add RF instruction which reached the bottom entry is also used to update the corresponding bit position of duplicate free list 203 to indicate that the bit position is again free for use, and the instruction can be invalidated and removed from the queue. Also, since the duplicate field of the last remaining instruction is now zero, when that last remaining instruction reaches the bottom entry of a queue, it is considered ready for execution and can be selected for execution by an arbiter.

Figure 8:
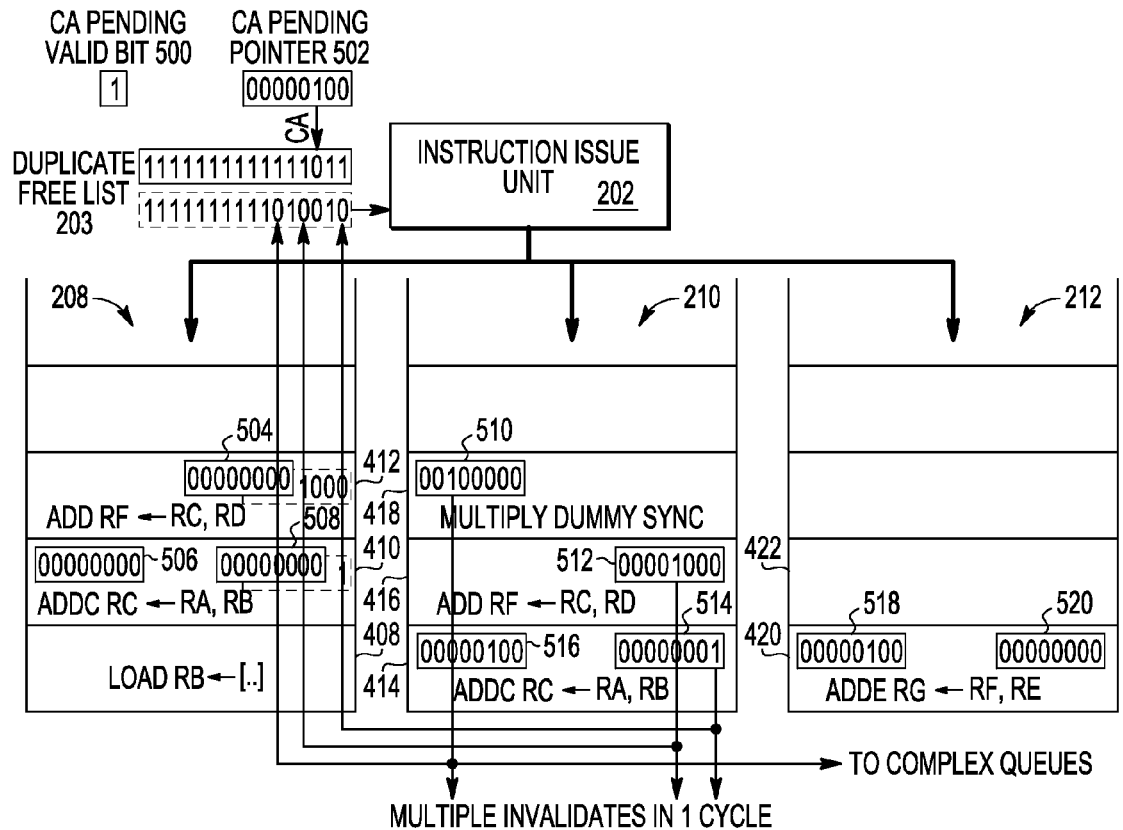
Figure 9:
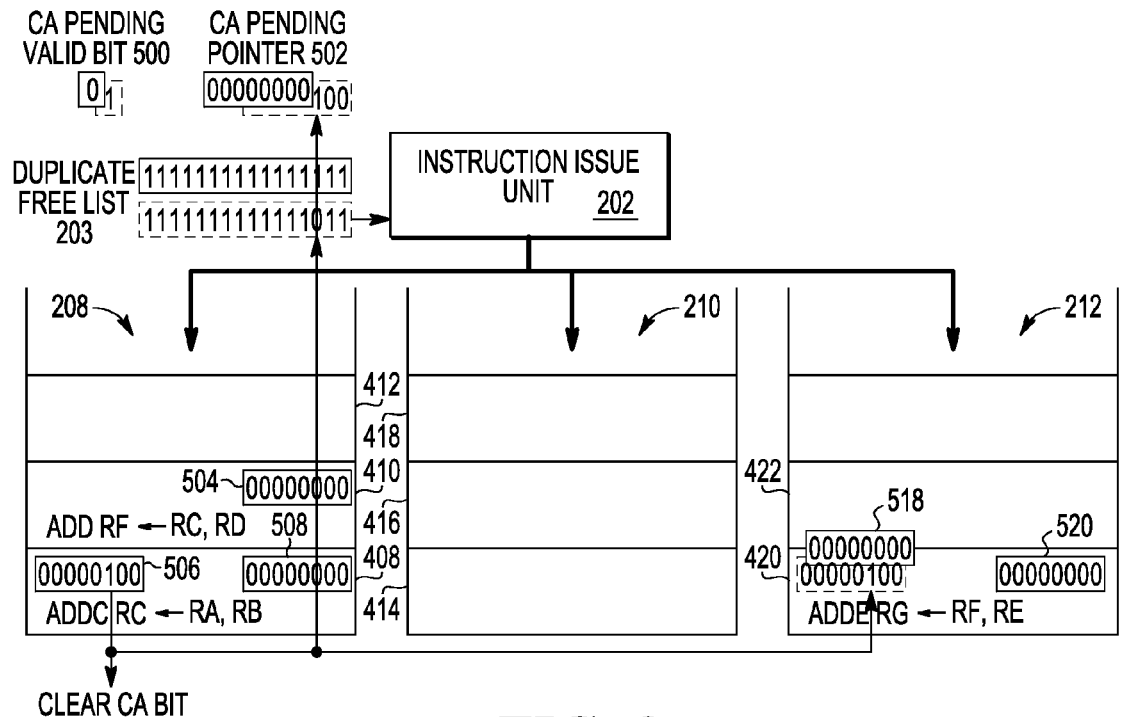

FIGS. 8 and 9 illustrate diagrams of an example instruction handling using the duplicate field, status_duplicate field, and sync_duplicate field of 1-HOT DUPLICATE field 304. In the example of FIGS. 8 and 9, the following example instruction sequence is assumed:

Load RBF←[..]
Addc RC←RA, RB
Adde RG←RF, RE
Add RF←RC, RD
Mult

As described above, the first register reference of the Load, Addc, Add, or Adde instruction refers to the destination register of the instruction, and the second and third register references refer to the source registers of the add instructions (the general purpose registers which store the sources of the add instruction). Also, the Addc instruction generates or writes (i.e. updates) a carry bit as a result of the instruction. In one embodiment, the execution unit which executes the Addc instruction (such as the appropriate integer execution unit) will write the carry bit to a carry register which may also be located in the execution unit or elsewhere within processor 102. Therefore, the Addc instruction has two destinations: (1.) the GPR provided in the instruction in which to store the result of the addition and (2.) the carry register. Also, the Adde instruction uses (i.e. reads) a previously generated carry bit as an additional source operand. For example, for the first Adde instruction above, the contents of RF, RE, and the carry bit from the carry register are added, the result of which is stored in RG. Therefore, the Adde instruction uses 3 source operands. In this example, the carry bit is generated by the Addc RC instruction, which is the most recent carry generating instruction in this example Also illustrated in FIGS. 8 and 9 is carry (CA) pending pointer 502 and carry (CA) pending valid bit 500. This may be located with duplicate free list 203 in instruction issue unit 202. In the example of FIGS. 8 and 9, duplicate free list not only keeps track of duplicate and triplicate instructions, but is also used to track carry generating/using instructions within the queues as well as dummy sync instructions (also referred to as dummy instructions or sync instructions) within the queues. As will be described in more detail below, CA pending pointer 502 is used to keep track of which bit locations of duplicate free list 203 (and of the status_duplicate field of the corresponding instructions which generate a carry) are being used for maintaining carry information. CA pending valid bit 500 is a single bit which, if asserted, indicates at least one bit location in CA pending pointer 502 is using a bit location in duplicate free list 203 (e.g. indicates that at least one bit of CA pending pointer 502 is at a logic level one).

Note that the examples which will be described herein, the carry bit is used as a particular example of a status bit. Therefore, the descriptions having been primarily with respect to a carry bit and instructions which generate and/or use a carry bit, but the descriptions and methodology apply to other status bits as well. For example, in addition to a CA pending pointer field and CA pending valid bit, there may be a CR (condition register) pending pointer field and a CR pending valid bit. In this manner, bit locations within the duplicate free list may be used to indicate usage of bit locations for any type of status as well as to keep track of duplicate and triplicate instructions.

Also, in some instances, an instruction which is of a different type than that which can be handled by the arbiter connected to the queues but has a dependency on an instruction in those queues is dispatched. For example, a multiply instruction, which needs to be handled by a complex integer execution unit 248 may be dependent on a load or add instruction, but complex arbiter 242 is not able to select instructions from load queues 208-214. In this situation, the actual multiply instruction is sent to a complex queue (such as queue 234 or 236) while a sync instruction (also referred to as a dummy sync instruction) is provided to the other queues which are of a different type (such as any of queues 208-214). Furthermore, for the actual instruction which has a corresponding sync instruction elsewhere in another queue, it's sync_pending bit in the corresponding PEND field 302 is set to indicate that it is waiting for results from other execution queues. This actual instruction therefore cannot be ready for selection for execution until it's sync_pending bit is cleared. As will be described in more detail below, the duplicate free list may also be used to keep track of sync instructions.

In the examples of FIGS. 8 and 9 (as well as FIGS. 10-13), for each instruction in each entry of a queue which is duplicated, a representation of the corresponding duplicate field of 1-HOT DUPLICATE field 304 is provided in the right hand side of the entry. For each adde or addc instruction, a representation of the corresponding status_duplicate field of 1-HOT DUPLICATE field 304 is provided in the left hand side of the entry. For each dummy sync instruction, a representation of the corresponding sync_duplicate field of 1-HOT DUPLICATE field 304 is provided in the left hand side of the entry. Note that, in one embodiment, CA pending pointer 502, as well as each of the duplicate fields, status_duplicate fields, and sync_duplicate fields of the instruction queue entries each include a same number of bits. Therefore, in the current example, each would include 16 bits. However, in order to simplify the illustrations going forward (for FIGS. 8-13), only the lower 8 bit locations (bit locations 7-0) are being illustrated for the fields in the queue entries. Also, for the examples described herein, a duplicate free list pointer may be used to keep track of free bit locations which may be used for keeping track of duplicate instructions, sync instructions, or status bits, as will be described below, in which a logic level 1 in a bit location indicates an available bit location and a logic level 0 in a bit location indicates a currently used and thus currently unavailable bit location.

In the examples herein, the dotted-line versions of duplicate free list 203 or of any of the fields within the entries illustrate a starting value when the snapshot is initially taken, and the solid line version represents the resulting values after some instruction processing is performed. In the example of FIG. 8, instruction unit 202 has previously dispatched the load RB instruction to queue 208. It is currently stored in entry 408. Also, instruction unit 202 has dispatched the Addc RC instruction to queues 208 and 210. The Addc RC instruction was sent to both queues 208 and 210 since it includes dependencies on instructions already in the queue. In the current example, at the current snapshot in time, the instruction on which the Addc RC instruction depended in queue 210 has already been selected for execution and thus removed from queue 210. Therefore, the Addc instruction is in the bottom entry of queue 210. Since duplicate instructions were dispatched, one bit of the duplicate field of each multiple instruction is asserted to a logic level 1 (the bit in bit location 0, in this example). Therefore, the original value of duplicate field 508 of the Addc RC instruction in queue 208 (the one in the dotted lines) and the value of duplicate field 514 of the Add RC instruction in queue 210 have a single bit asserted to indicate that the instructions are duplicates. Also, a first bit in the original value of duplicate free list 203 (in the dotted lines) is at a logic level 0 to indicate that that bit location is in use. Also, since the Addc RC instruction writes (i.e. generates) a carry bit, a bit location, corresponding to an available bit location of duplicate free list 203, of the status_duplicate field of each Addc RC instruction is used. In the current example, bit location 2 is used, in which bit location 2 of duplicate free list 203 is cleared to a logic level 0 (as indicated in the dotted lined version of duplicate free list 203), and bit location 2 of each of status_duplicate fields 506 and 516 is set to a logic level 1. Also, the CA_WRITE bit in PEND field 302 of each of the Addc RC instructions is set to a logic level 1 to indicate that the instruction will write a carry bit.

Instruction unit 202 has also dispatched the Adde RG instruction to queue 212 and currently is stored in entry 420 of queue 212. Since it is not a duplicate instruction, its duplicate field 520 is all zeros. However, as described above, the Adde instruction requires the most recent generated carry bit. Therefore, the value of CA pending pointer 502 is used to generate the status_duplicate field 518 of the Adde instruction. That is, CA pending pointer 502 keeps track of the duplicate bit location corresponding to the most recently generated carry bit at any point in time, and therefore, that is the bit location asserted in the status_duplicate field of an instruction dispatched to a queue which uses the carry bit. That is, the value of CA pending pointer 502 is stored to the status_duplicate field. Also, since the adde instruction requires the use of the carry bit, the CA_PENDING bit of PEND field 302 of the adde instruction in queue 212 is set to indicate that it is waiting for a carry bit to be forwarded from another execution queue. The Add RF instruction has been dispatched by instruction unit 202 to queues 208 and 210. Since this add instruction uses RC as a source register, this instruction is dependent on the Addc instructions already in queues 208 and 210. Therefore, it is dispatched into subsequent entries of each queue. They are currently stored in entries 412 and 416. In this case, the Add RF instruction is duplicated. Therefore, upon dispatching the Add RF instructions to the queues, bit location 3 of duplicate free list 203 is cleared to a logic level 0 (as shown in the dotted line version) and bit location 3 of duplicate fields 512 and 504 are asserted to a logic level 1 (as shown in the dotted line version of field 504). A Multiply Dummy Sync instruction (corresponding to the actual multiply instruction which dispatched to a complex integer queue) is dispatched to queue 210. That is, it is assumed it includes a dependency on an instruction already present in queue 210. In this case, bit location 5 of duplicate free list 203 is used to keep track of the instruction. Therefore, bit location 5 of sync_duplicate field 510 is asserted to a logic level 1.

Referring to queue 210 of FIG. 8, with the existence of the Addc instruction at the bottom entry of queue 210 with a non-zero duplicate field 514, some instruction processing is performed. As described above, the Addc instruction is invalidated, and the asserted bit in bit location 0 of duplicate field 514 is used to clear bit location 0 of duplicate field 508 (thus resulting in the value in the solid lined box) and is used to set bit location 0 of duplicate free list 203 to a logic level 1 (as seen in the solid lined box) to indicate that this bit location is now free for use again by another instruction dispatched to the queues. Once the Addc instruction from bottom entry 414 is invalidated, the next sequential instruction is also an instruction with a non-zero duplicate field 512. Similarly, this instruction is also invalidated in the same cycle as the Addc instruction and the asserted bit in bit location 3 of duplicate field 512 is used to clear bit location 3 of duplicate field 504 (thus resulting in the value in the solid lined box) and is used to set bit location 3 of duplicate free list 203 to a logic level 1 (as seen in the solid lined box) to indicate that this bit location is now free for uses again by another instruction dispatched to the queues. Once this Add instruction is invalidated, the next sequential instruction is a dummy sync instruction which has reached the bottom entry of the queue, and is therefore also processed. It is also invalidated in the same clock cycle as the Addc and Add instructions, and the asserted bit in bit location 5 of sync_duplicate field 510 is sent to the complex queue which contains the actual multiple instruction to clear its sync_pending bit in PEND field 302. It is also used to set bit location 5 of duplicate free list 203 to a logic level 1 (as seen in the solid lined box) to indicate that this bit location is now free for use again by another instruction dispatched to the queues.

Referring now to FIG. 9, note that queue 210 is empty since the 3 instructions in this queue in FIG. 8 were all processed and invalidated. Also, note that dotted line version of duplicate free list 203 now corresponds to the solid lined version in FIG. 8, since it will be updated as a result of the processing which will be done in reference to FIG. 9. In FIG. 9, the Load RB instruction from queue 208 has been selected for execution and has thus been removed from queue 208. Each of the instructions in queue 208 has therefore been shifted down by one, and the Addc instruction is now in bottom entry 408. In this case, the Addc instruction is a valid instruction ready to be selected for execution because its duplicate field 508 is zero, indicating that it is the only remaining instruction with no other duplicates. However, the status_duplicate field 506 has a logic level one in bit location 2 which indicates that the instruction writes to a status bit, e.g. the carry bit in the current example, and that another instruction is dependent upon this carry bit. The asserted bit in bit location 2 is used to clear the bit in bit location 2 of status_duplicate field 518, thus resulting in the value of the solid lined box. In this manner, the Adde instruction is ready for selection for execution since both its duplicate field 520 and status_duplicate field 518 are zero. That is, note that for an instruction which generates a status bit (e.g. carry bit), its duplicate field must be zero for it to be ready for execution, but its status_duplicate field need not be zero since it is used to notify other instructions that the carry bit is now valid. However, for an instruction which reads or uses a status bit (e.g. the carry bit), both its duplicate field and status_duplicate field must be zero for it to be ready for execution. If its status_duplicate field is non-zero, then it is still waiting on a result of another instruction which generates the corresponding status bit. Note that the asserted bit in bit location 2 of status_duplicate field 506 is also used to set bit location 2 of duplicate free list back to a logic level 1 (as shown in the solid lined box), and is also used to clear bit location 2 of CA pending pointer 502 since bit location 2 of duplicate free list 203 no longer corresponds to a carry bit. Also, since CA pending pointer 502 is now all zeros, CA pending valid bit 500 is also cleared to a logic level zero. However, if there were other asserted bits in CA pending pointer 502, even though bit location 2 is cleared, CA pending valid bit 500 would have remained asserted.

Figure 10:
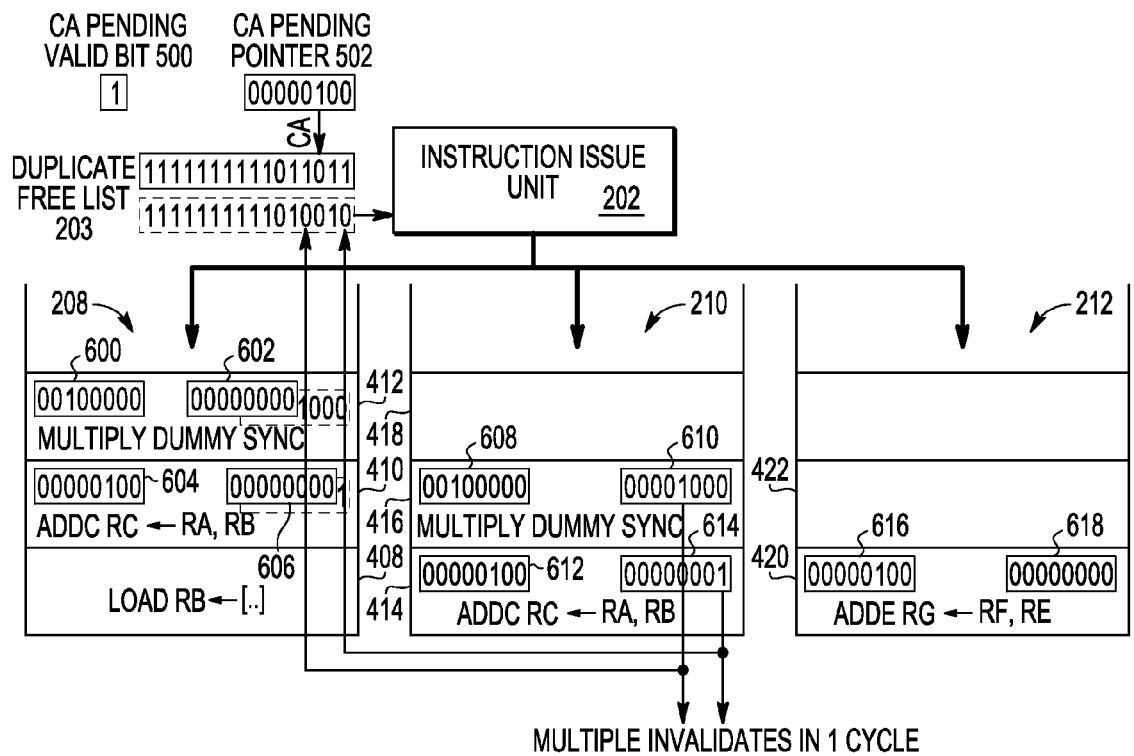
Figure 11:
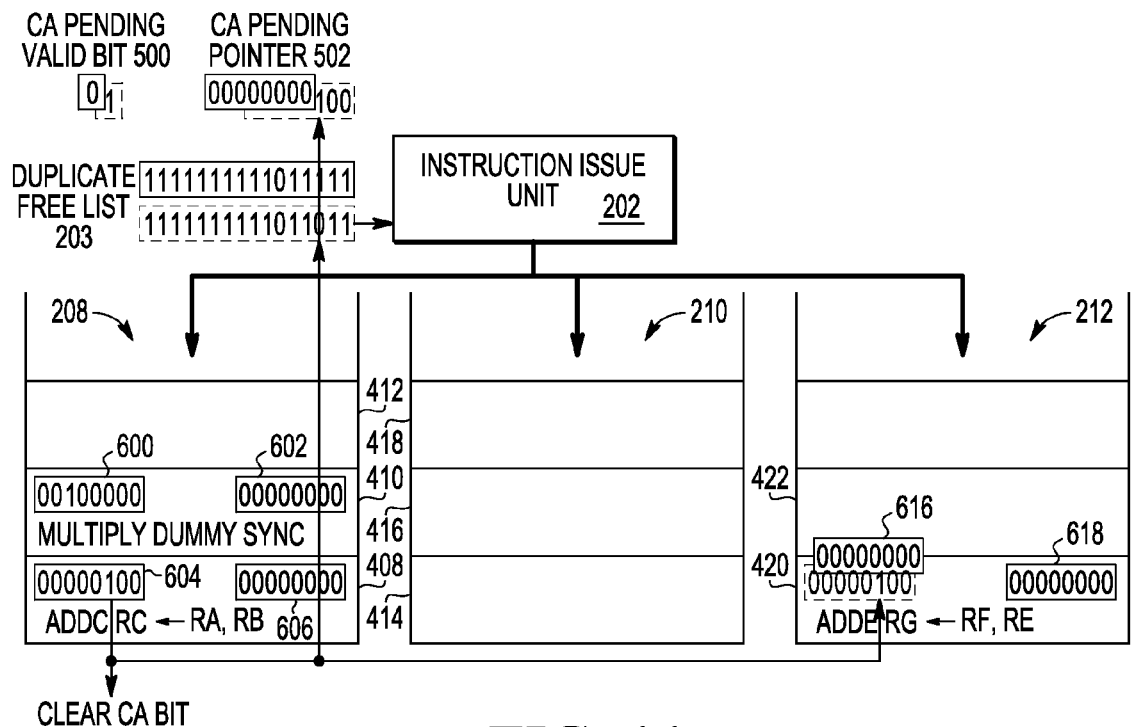

FIGS. 10 and 11 illustrate diagrams of an example instruction handling using the duplicate field, status_duplicate field, and sync_duplicate field, of 1-HOT DUPLICATE field 304. In the example of FIGS. 10 and 11, the following example instruction sequence is assumed:

Load RBF←[..]
Addc RC←RA, RB
Adde RG←RF, RE
Mult

Therefore, note that the instruction sequence is very similar to that of the example in FIGS. 8 and 9, with the exception that there is no Add RF←RC, RD instruction. also, the Mult instruction, in the current example, depends on an instruction in each of queues 208 and 210 (rather than on just an instruction in queue 210, as in the previous example). Therefore, the descriptions of fields 604, 606, 612, 614, 616, and 618 are analogous to the descriptions of fields 506, 508, 516, 514, 518, and 520, respectively, provided above with respect to FIGS. 8 and 9.

After instruction unit 202 has dispatched the load RB instruction to queue 208, the Addc instruction to each of queues 208 and 210, and the Adde instruction to queue 212, note that bit location 1 (due to duplicate Addc instructions) and bit location 2 (due to the carry bit generated by the Addc instruction) of duplicate free list 203 are at a logic level zero (in the dotted lined version of duplicate free list 203). Also, due to bit location 2 of duplicate free list being a logic level 0 to keep track of the carry bit generated by the Addc instruction, CA pending pointer is set to point to bit location 2 (in which, for example, bit location 2 of CA pending pointer 502 is set to a logic level 1). In the current example, instruction unit 202 dispatches the multiply instruction. The actual multiply instruction may be dispatched to a complex integer queue. In the current example, it is assumed that the multiply instruction includes a dependency on an instruction already present in queue 208 as well as on an instruction already present in queue 210. Therefore, duplicate multiply dummy sync instructions are dispatched to queues 208 and 210. In this case, bit location 5 of duplicate free list 203 is used to keep track of the sync instructions, and bit location 5 of sync_duplicate field 608 is asserted to a logic level 1. Also, since the dummy sync instruction itself is also a duplicate instruction, bit location 3 of duplicate fields 610 and 602 are asserted to a logic level 1, and bit location 3 of duplicate free list 203 is cleared to a logic level 0 (as seen in the dotted lined versions of field 602 and duplicate free list 203).

Referring to queue 210 of FIG. 10, with the existence of the Addc instruction at the bottom entry of queue 210 with a non-zero duplicate field 614, some instruction processing is performed. As described above, the Addc instruction is invalidated, and the asserted bit in bit location 0 of duplicate field 614 is used to clear bit location 0 of duplicate field 606 (thus resulting in the value in the solid lined box) and is used to set bit location 0 of duplicate free list 203 to a logic level 1 (as seen in the solid lined box) to indicate that this bit location is now free for use again by another instruction dispatched to the queues. Once the Addc instruction from bottom entry 414 is invalidated, the next sequential instruction is also an instruction with a non-zero duplicate field 610. Similarly, this instruction is also invalidated in the same cycle as the Addc instruction and the asserted bit in bit location 3 of duplicate field 610 is used to clear bit location 3 of duplicate field 602 (thus resulting in the value in the solid lined box) and is used to set bit location 3 of duplicate free list 203 to a logic level 1 (as seen in the solid lined box) to indicate that this bit location is now free for uses again by another instruction dispatched to the queues. Therefore, one of the duplicate multiply dummy sync instructions has been invalidated, and the multiply dummy sync instruction will actually be processed when the remaining multiply dummy sync instruction in queue entry 412 reaches the bottom entry of queue 208.

Referring now to FIG. 11, note that queue 210 is empty since the 2 instructions in this queue in FIG. 10 were all processed and invalidated. Also, note that dotted line version of duplicate free list 203 now corresponds to the solid lined version in FIG. 10, since it will be updated as a result of the processing which will be done in reference to FIG. 11. In FIG. 11, the Load RB instruction from queue 208 has been selected for execution and has thus been removed from queue 208. Each of the instructions in queue 208 has therefore been shifted down by one, and the Addc instruction is now in bottom entry 408. In this case, the Addc instruction is a valid instruction ready to be selected for execution because its duplicate field 606 is zero, indicating that it is the only remaining instruction with no other duplicates. However, status_duplicate field 604 has a logic level one in bit location 2 which indicates that the instruction writes to a status bit, e.g. the carry bit in the current example, and that another instruction is dependent upon this carry bit. The asserted bit in bit location 2 is used to clear the bit in bit location 2 of status_duplicate field 616, thus resulting in the value of the solid lined box. In this manner, the Adde instruction is ready for selection for execution since both its duplicate field 618 and status_duplicate field 616 are zero. Note that the asserted bit in bit location 2 of status_duplicate field 604 is also used to set bit location 2 of duplicate free list 203 back to a logic level 1 (as shown in the solid lined box), and is also used to clear bit location 2 of CA pending pointer 502 since bit location 2 of duplicate free list 203 no longer corresponds to a carry bit. Also, since CA pending pointer 502 is now all zeros, CA pending valid bit 500 is also cleared to a logic level zero.

After selecting the valid Addc instruction for execution, the remaining multiple dummy sync instruction is shifted to bottom entry 408 of queue 208 and is therefore processed. At this point, the multiply dummy sync instruction is invalidated, and the asserted bit in bit location 5 of sync_duplicate field 600 is sent to the complex queue which contains the actual multiple instruction to clear its sync_pending bit in PEND field 302 in the next cycle. It is also used to set bit location 5 of duplicate free list 203 to a logic level 1 (as seen in the solid lined box) to indicate that this bit location is now free for use again by another instruction dispatched to the queues.

Figure 12:
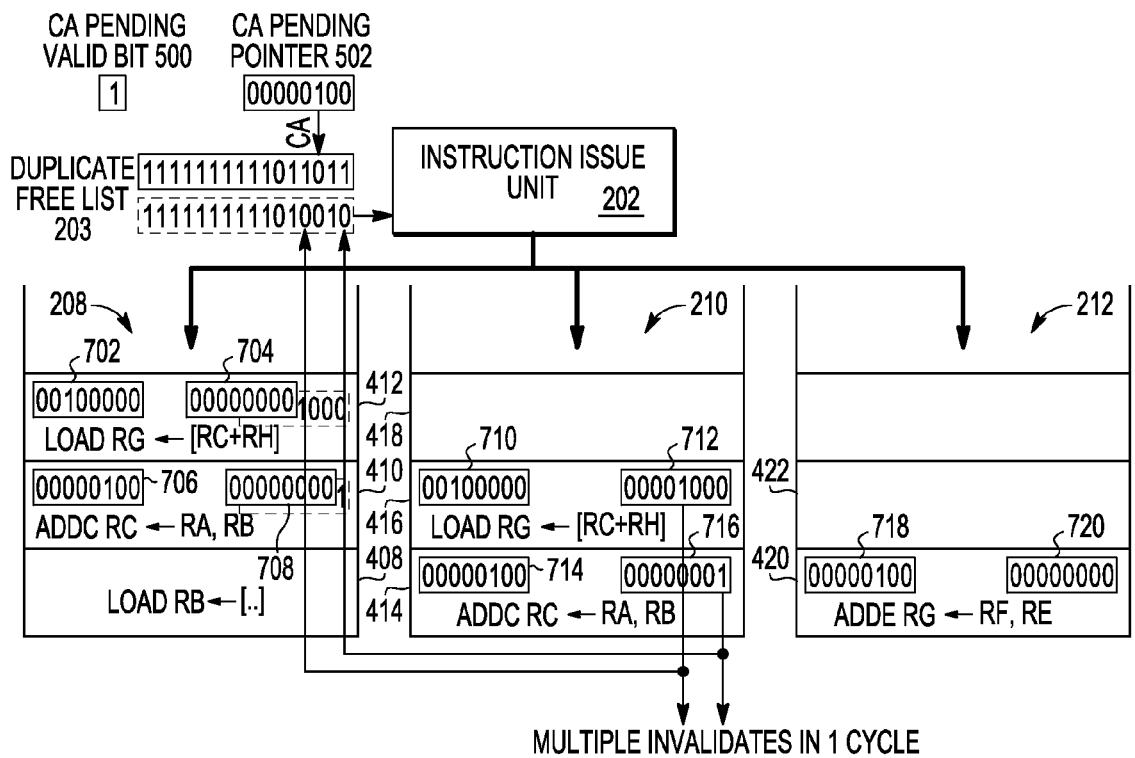
Figure 13:
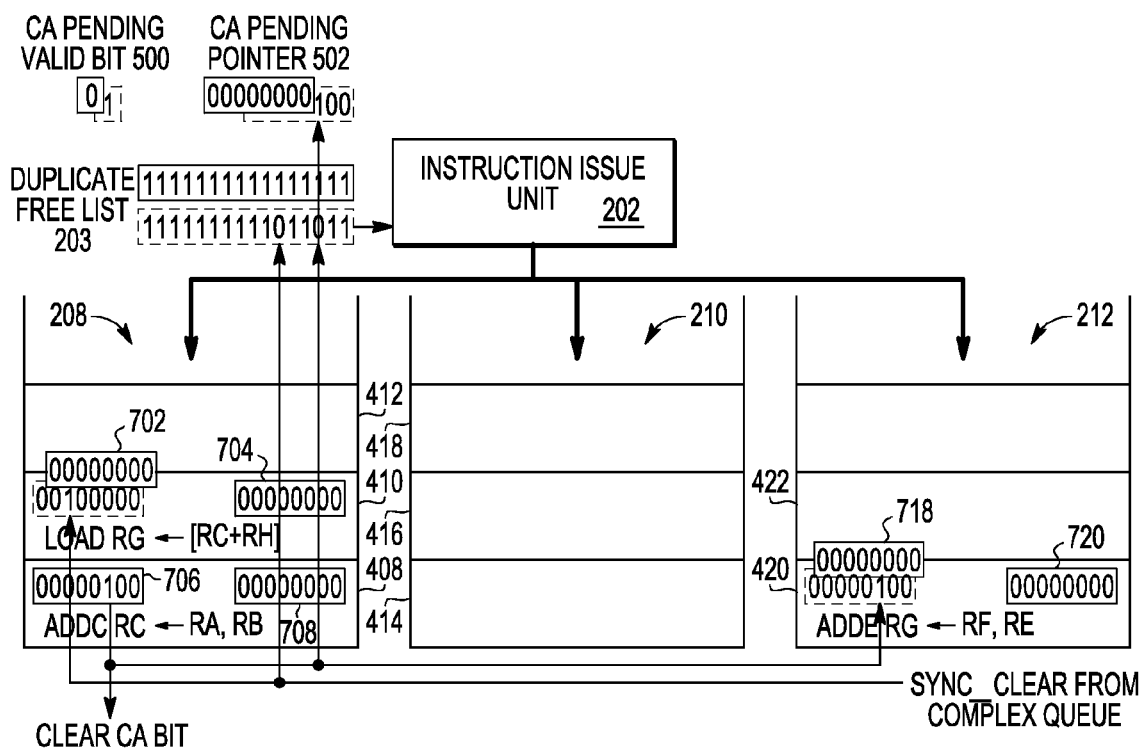

FIGS. 12 and 13 illustrate diagrams of an example instruction handling using the duplicate field, status_duplicate field, and sync_duplicate field, of 1-HOT DUPLICATE field 304. In the example of FIGS. 12 and 13, the following example instruction sequence is assumed:

Load RB←[..]
Addc RC←RA, RB
Adde RG←RF, RE
Load RG←[RC+RH]

Therefore, note that the instruction sequence is very similar to that of the example in FIGS. 8 and 9, with the exception that there is no Add RF←RC, RD instruction or Mult instruction. Instead, after the Adde instruction, is a load instruction which loads the value stored in the address location RC+RH into RG. Therefore, note that the load instruction is dependent on the Addc RC instruction (due to the use of RC), and it is assumed that the load instruction is also dependent on an instruction in the complex queue which generates RH. Note that the descriptions of fields 706, 708, 714, 716, 718, and 720 are analogous to the descriptions of fields 506, 508, 516, 514, 518, and 520, respectively, provided above with respect to FIGS. 8 and 9.

After instruction unit 202 has dispatched the load RB instruction to queue 208, the Addc instruction to each of queues 208 and 210, and the Adde instruction to queue 212, note that bit location 1 (due to duplicate Addc instructions) and bit location 2 (due to the carry bit generated by the Addc instruction) of duplicate free list 203 are at a logic level zero (in the dotted lined version of duplicate free list 203). Also, due to bit location 2 of duplicate free list 203 being a logic level 0 to keep track of the carry bit generated by the Addc instruction, CA pending pointer is set to point to bit location 2 (in which, for example, bit location 2 of CA pending pointer 502 is set to a logic level 1). In the current example, instruction unit 202 then dispatches the load RG instruction. Since the load RG instruction is dependent on the Addc instruction, it is dispatched as duplicate instructions to both queue 208 and 210. In this case, bit location 3 of duplicate free list 203 is used to keep track of the duplicate instructions and is at a logic level 0 (as seen in the dotted line version). Therefore, bit location 3 of each of duplicate fields 704 (in the dotted lined version) and 712 are at a logic level 1. Also, since it is assumed that the load instruction is also dependent on an instruction in the complex queue, a load dummy sync instruction corresponding to the load RG instruction is dispatched to the complex queue. In this case, bit location 5 of duplicate free list 203 is selected to keep track of the dummy sync instruction and is therefore at a logic level 0 (as seen in the dotted line version). Also, bit location 5 of each of sync_duplicate fields 702 and 710 are at a logic level 1 to indicate that these instructions are waiting for a dummy sync instruction from another queue (e.g. the complex integer queue) to be processed and thus clear this bit in the sync_duplicate field. Also, bit location 5 of the sync_duplicate field of the load dummy sync instruction is also set to a logic level 1 (as was done for the multiply dummy sync instruction in the examples of FIGS. 8 and 10). Also, the sync_pending field of PEND 302 of each of the actual load RG instructions in queues 208 and 210 is set to a logic level 1 indicating that it is waiting for results from other execution queues.

Referring to queue 210 of FIG. 12, with the existence of the Addc instruction at the bottom entry of queue 210 with a non-zero duplicate field 716, some instruction processing is performed. As described above, the Addc instruction is invalidated, and the asserted bit in bit location 0 of duplicate field 716 is used to clear bit location 0 of duplicate field 708 (thus resulting in the value in the solid lined box) and is used to set bit location 0 of duplicate free list 203 to a logic level 1 (as seen in the solid lined box) to indicate that this bit location is now free for use again by another instruction dispatched to the queues. Once the Addc instruction from bottom entry 414 is invalidated, the next sequential instruction is also an instruction with a non-zero duplicate field 712. Similarly, this instruction is also invalidated in the same cycle as the Addc instruction and the asserted bit in bit location 3 of duplicate field 712 is used to clear bit location 3 of duplicate field 704 (thus resulting in the value in the solid lined box) and is used to set bit location 3 of duplicate free list 203 to a logic level 1 (as seen in the solid lined box) to indicate that this bit location is now free for uses again by another instruction dispatched to the queues. Therefore, one of the duplicate load RG instructions has been invalidated.

Referring now to FIG. 13, note that queue 210 is empty since the 2 instructions in this queue in FIG. 12 were all processed and invalidated. Also, note that dotted lined version of duplicate free list 203 now corresponds to the solid lined version in FIG. 12, since it will be updated as a result of the processing which will be done in reference to FIG. 13. In FIG. 13, the Load RB instruction from queue 208 has been selected for execution and has thus been removed from queue 208. Each of the instructions in queue 208 has therefore been shifted down by one, and the Addc instruction is now in bottom entry 408. In this case, the Addc instruction is a valid instruction ready to be selected for execution because its duplicate field 708 is zero, indicating that it is the only remaining instruction with no other duplicates. However, status_duplicate field 706 has a logic level one in bit location 2 which indicates that the instruction writes to a status bit, e.g. the carry bit in the current example, and that another instruction is dependent upon this carry bit. The asserted bit in bit location 2 is used to clear the bit in bit location 2 of status_duplicate field 718, thus resulting in the value of the solid lined box. In this manner, the Adde instruction is ready for selection for execution since both its duplicate field 720 and status_duplicate field 718 are zero. Note that the asserted bit in bit location 2 of status_duplicate field 706 is also used to set bit location 2 of duplicate free list 203 back to a logic level 1 (as shown in the solid lined box), and is also used to clear bit location 2 of CA pending pointer 502 since bit location 2 of duplicate free list 203 no longer corresponds to a carry bit. Also, since CA pending pointer 502 is now all zeros, CA pending valid bit 500 is also cleared to a logic level zero.

After selecting the valid Addc instruction for execution, the remaining Load RG instruction is shifted to bottom entry 408 of queue 208. However, the Load RG instruction is not ready for execution until its sync_duplicate field is zero since it is dependent on an instruction in another type queue. Once that instruction in the other type queue has been executed, the SYNC_clear of that instruction can be sent from the other type queue (e.g. the complex integer queue) to queue 208 in order to clear bit location 5 of sync_duplicate field 702 of the load RG instruction, as shown by the solid lined version of field 702 in FIG. 13. Also, the SYNC_clear can be used to clear the sync_pending bit of PEND field 302 of the load RG instruction. At this point, the load RG instruction is ready for selection for execution.

Figure 14:
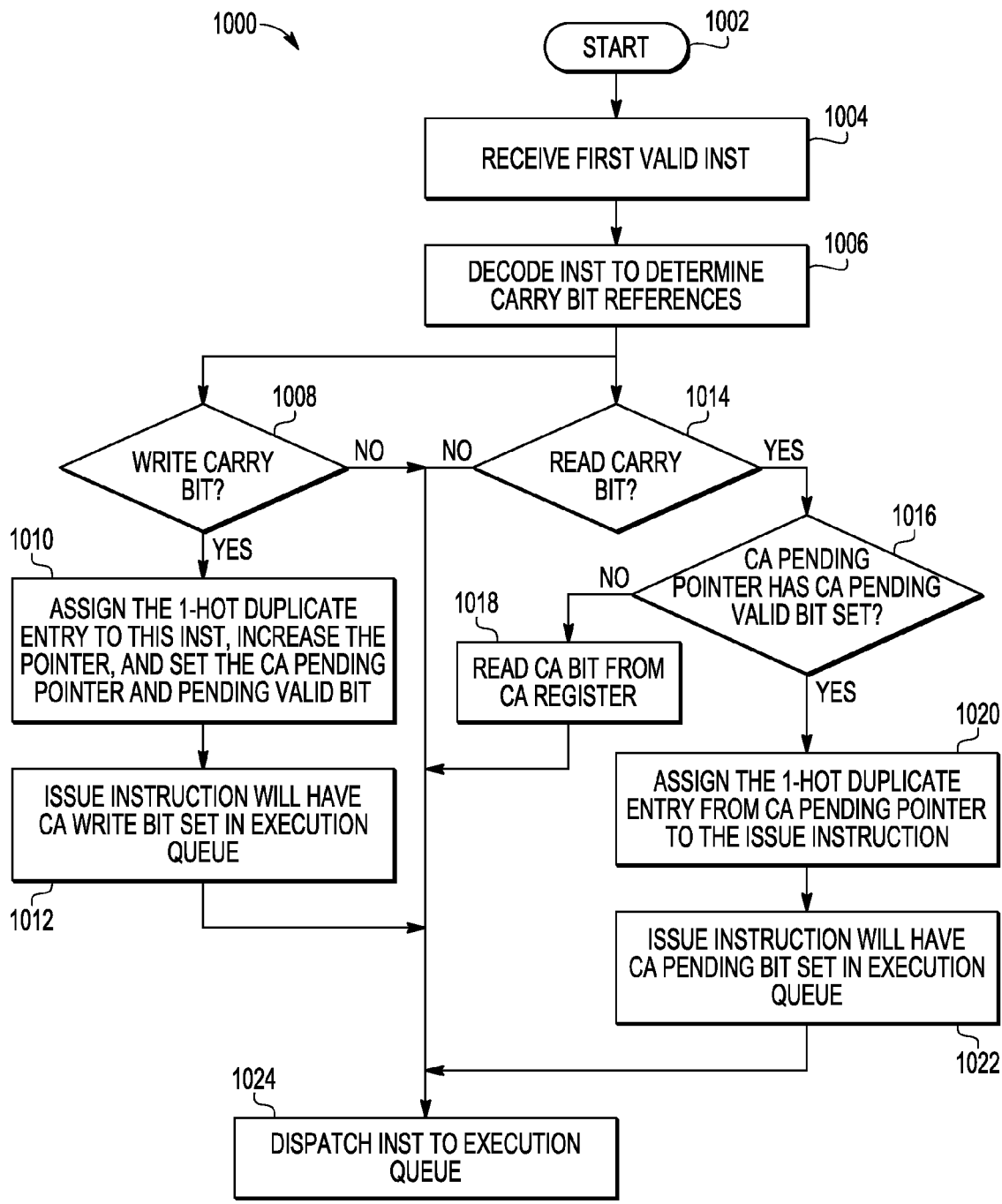
FIG. 14 is a flow diagram of an embodiment of a method for processing a first valid instruction in the data processor of FIG. 2.

FIG. 14 illustrates, in flow diagram form, a method 1000 of processing an instruction received from instruction unit 202 in accordance with one embodiment. Method 1000 begins with start 1002 and proceeds to block 1004 in which a first valid instruction is received by instruction unit 202. Method 1000 proceeds to block 1006 in which instruction unit 202 decodes the instruction to determine carry bit references. For example, as described above, an instruction may generate or write or update a carry bit (such as an Addc instruction) or an instruction may read or use a carry bit (such as an Adde instruction). Other instructions may both write and read a carry bit. From block 1006, method 1000 proceeds to decision diamond 1008 and decision diamond 1014. At decision diamond 1008, it is determined whether the decoded instruction writes or updates a carry bit. If not, method 1000 proceeds to block 1024 in which the instruction is dispatched to an execution queue. If it does write a carry bit, method 1000 then proceeds to block 1010 in which a 1-hot duplicate entry is assigned to the instruction. That is, a bit location of duplicate free list 203 is assigned to keep track of the carry bit, and the corresponding bit location of the duplicate field of the instruction is set to a logic level 1 (as was described above, for example, in reference to the Addc instruction). Also, the pointer is increased (referring to the duplicate free list pointer which keeps track of available bit locations in duplicate free list 203). Also, the CA pending pointer is set to point to the appropriate bit location (e.g. the corresponding bit location of the CA pending pointer is set to a logic level 1, as described, for example, in reference to CA pending pointer 502), and the CA pending valid bit is also asserted (e.g. set to a logic level one). Method 1000 then proceeds to block 1012 in which the issued decoded instruction will have the corresponding CA write pending bit sit when stored in an execution queue. For example, the CA_WRITE field of the PEND field 302 of the issued instruction will be set when dispatched and stored in an execution queue. Method 1000 then proceeds to block 1024 in which the issued instruction is dispatched.

Referring back to decision diamond 1014, if the decoded instruction does not read a carry bit, then method 1000 proceeds to block 1024. If the decoded instruction does read or use a carry a bit, method 1000 proceeds to decision diamond 1016 in which it is determined if the CA pending valid bit corresponding to the CA pending pointer is set (e.g. is a logic level one). If not, method 1000 proceeds to decision diamond 1018 in which the CA bit is read from the carry (CA) register. For example, the register may be located in the corresponding execution unit of processor 102 or elsewhere within processor 102. Method 1000 then proceeds to block 1024. If, at decision diamond 1016, the CA pending valid bit is set, method 1000 proceeds to block 1020 in which the 1-hot duplicate entry from the CA pending pointer is assigned to the issued decoded instruction. For example, as described in reference to the Adde instruction above, the value of CA pending pointer 502 is stored in the status_duplicate field of 1-HOT DUPLICATE field 304 of the issued instruction when it is stored in a queue. Method 1000 proceeds to block 1022 in which the issued decoded instruction will have the CA_PENDING bit of PEND field 302 set when stored in the execution queue. Method 1000 then proceeds to block 1024.

Figure 15:
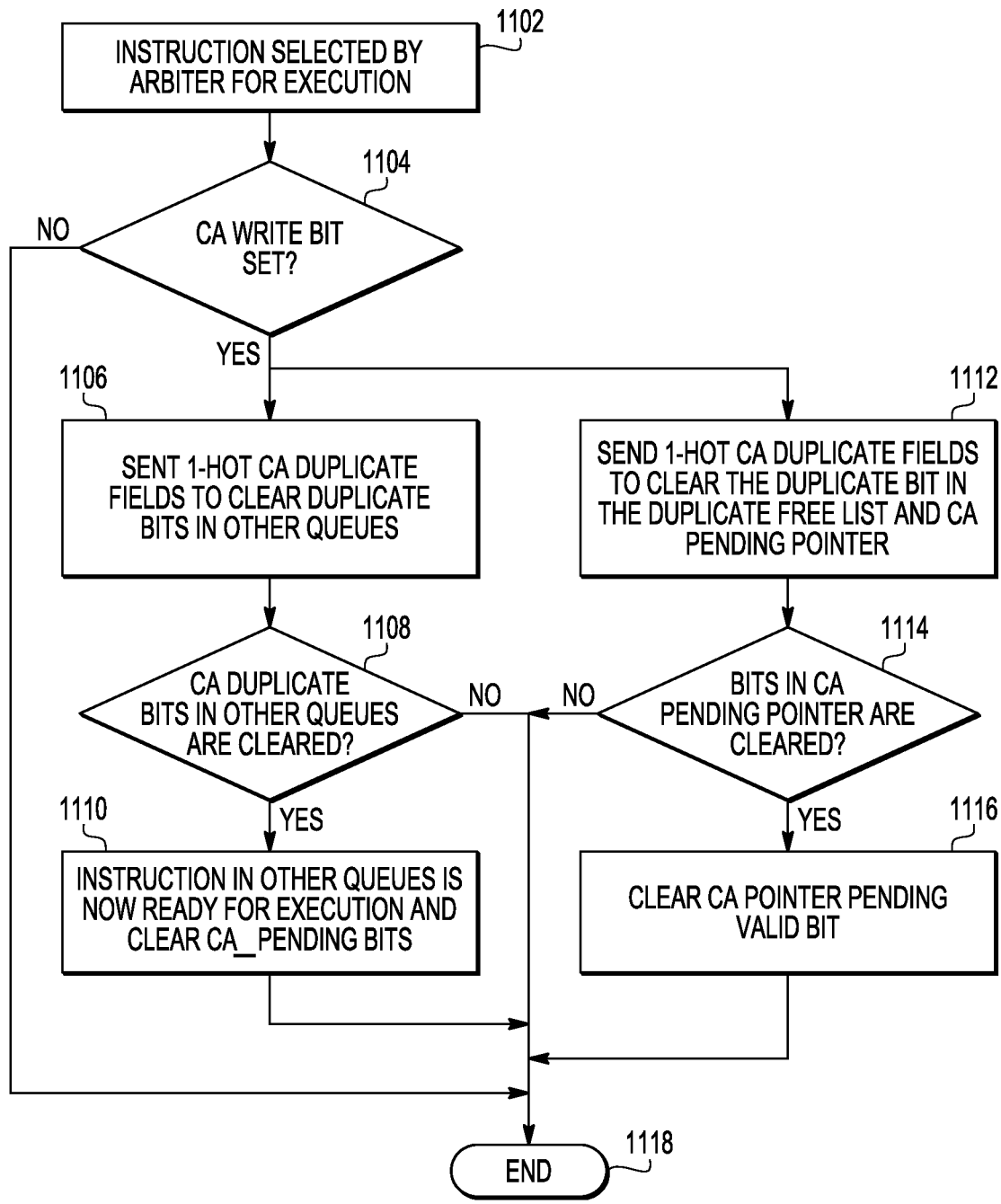
FIG. 15 is a flow diagram of an embodiment of a method for processing an instruction selected for execution in the data processor of FIG. 2.

FIG. 15 illustrates, in flow diagram form, a method 1100 of processing an instruction selected by an arbiter for execution in accordance with one embodiment. Method 1100 begins with block 1102 in which an instruction is selected by an arbiter for execution. For example, when an instruction is ready for execution and it reaches the bottom entry of an execution queue, it can be selected by an appropriate arbiter for execution. For example, an instruction may be selected by load arbiter 216 or integer arbiter 218 from a bottom entry of any of load queues 208, 210, 212, and 214. Note that for an instruction to be selected for execution by an arbiter, it must be a valid instruction ready for execution. This means that that the duplicate field of that instruction must be clear (all zeros). For example, referring to the example of FIGS. 8 and 9 above, when the Addc RC instruction in queue 210 reaches bottom entry 414, it is not a valid instruction ready for execution because duplicate field 514 is non-zero. In contrast, when the Addc instruction in queue 208 reaches bottom entry 408 (as in FIG. 9), it is a valid instruction ready for selection for execution since duplicate field 508 is clear. Referring back to FIG. 15, method 1100 proceeds to decision diamond 1104 in which it is determined if the CA_WRITE bit of the selected instruction is set (e.g. is at a logic level 1). If not, method 1100 ends at end 1118. However, if so, method 1100 proceeds to blocks 1106 and 1112. In block 1106, the 1-HOT CA duplicate fields are sent to clear the CA duplicate bits in other queues. For example, this may refer to using the status_duplicate field (which corresponds to the 1-HOT CA duplicate field) of the selected instruction to clear the corresponding asserted bit location in status_duplicate fields of other instructions. For example, as described above in reference to the Addc instruction in bottom entry 408 of queue 208 of FIG. 9 (which is the Addc instruction which may be selected for execution by the arbiter), the asserted bit in bit location 2 of status_duplicate field 506 is used to clear bit location 2 of status_duplicate field 518 of the Adde instruction in queue 212. Method 1100 proceeds to decision diamond 1108 in which it is determined if the CA duplicate bits (i.e. bits of the status_duplicate field) in the other queues are cleared. If so, method 1100 proceeds to block 1110 in which the instruction in these other queues whose bits of the status_duplicate field are cleared are now ready for execution. Also, the CA_PENDING bits of these other instructions which are now ready for execution are also cleared since the carry bit they are needing has been generated. For example, referring again to the example of FIG. 9, the CA_PENDING bit of PEND field 302 of the Adde instruction in queue 212 is cleared and since status_duplicate field 518 is now all zeros, it is a valid instruction ready for selection for execution by an arbiter. Method 1110 then ends at end 1118. If at decision diamond 1108 the CA duplicate bits in other queues are not all cleared, then method 1100 ends at end 1118. That is, if other bits within the status_duplicate field of an instruction are still set, then the instruction is still waiting for other carry bits to be generated and cannot yet be selected for execution.

Referring back to bock 1112, the 1-HOT CA duplicate fields (i.e. status_duplicate fields) are sent to clear the duplicate bit in the duplicate free list and CA pending pointer. For example, referring again to the example of FIG. 9, status_duplicate field 506 is used to set bit location 2 of duplicate free list 203 back to a logic level 1 to indicate it is now free for use and to clear bit location 2 of CA pending pointer 502 to a logic level 0 since bit location 2 of duplicate free list 203 is no longer keeping track of a carry bit. Method 1100 then proceeds to decision diamond 1114 in which it is determined if the bits in the CA pending pointer are cleared. If so, method 1100 proceeds to block 1116 in which the CA pointer pending valid bit is cleared and the method ends at end 1118. If there are other bits in the CA pending pointer which are still at a logic level 1, then the CA pointer pending valid bit is not cleared, and the method ends at end 1118. That is, referring back to the example of FIG. 9, since all bits in CA pending pointer 502 are cleared, CA pending valid bit 500 is also cleared.

Note that methods 1000 and 1100 have been described in reference to the carry bit as a particular example of a status bit. However, similar descriptions would apply to other status bits. For example, in block 1006, an instruction can be decoded to determine any references or dependencies on a status bit or group of status bits. In decision diamonds 1008 and 1014, determinations can be made as to whether the one or more status bits are written to or updated by the instruction and/or used or read by the instruction. Similarly, the corresponding status pending bits in PEND field 302 may be set or cleared as needed.

Figure 16:
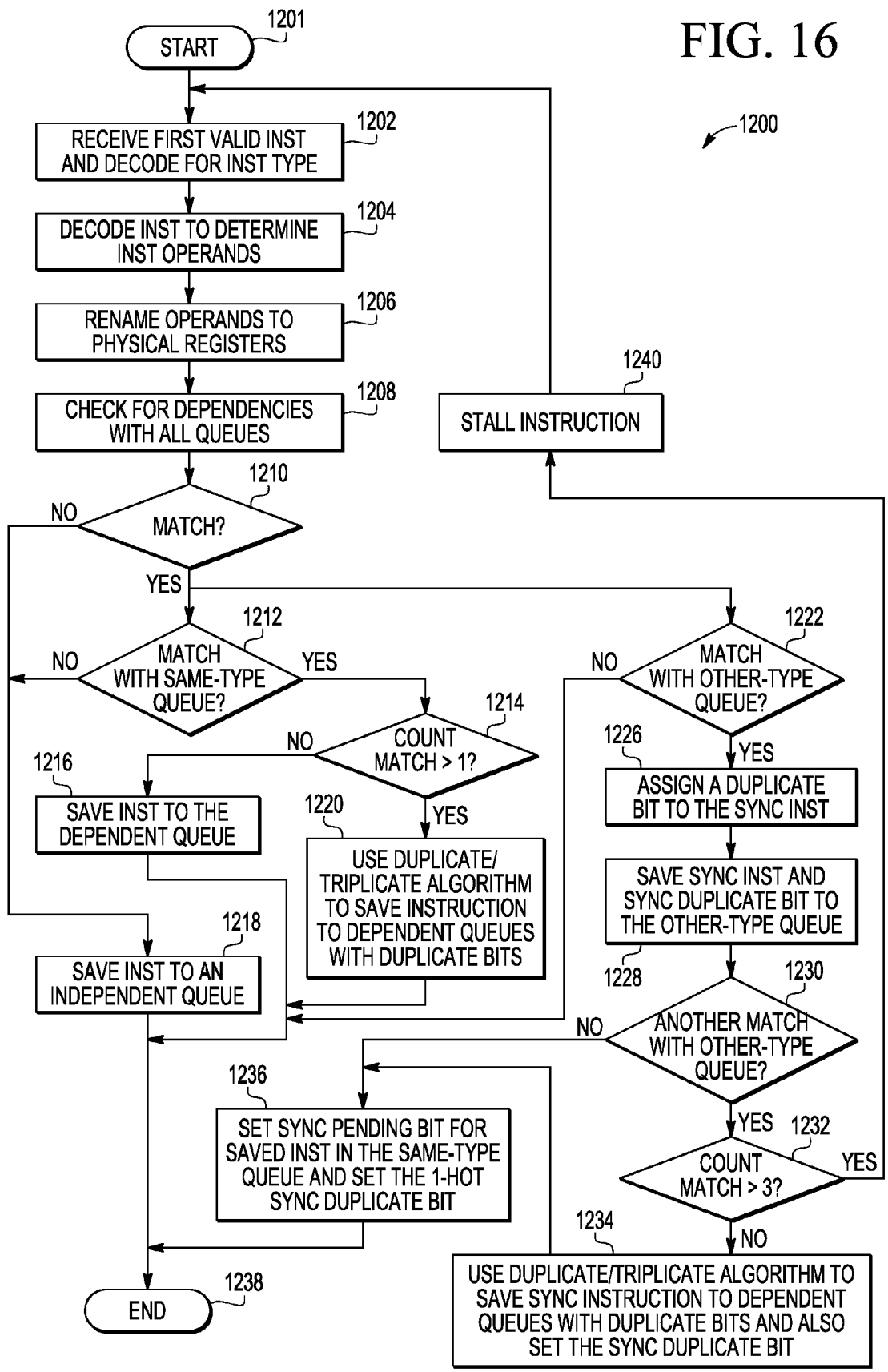
FIG. 16 is a flow diagram of an embodiment of a method for processing a first valid instruction in the data processor of FIG. 2.

FIG. 16 illustrates, in flow diagram form, a method 1200 of processing an instruction received by instruction unit 202 in accordance with one embodiment. Method 1200 begins with start 1201 and proceeds to block 1202 in which a first valid instruction is received and decoded to determine the instruction type. Method 1200 proceeds to block 1204 in which the received instruction is decoded to determine the operands of the instruction. Method 1200 proceeds to block 1206 in which the operands are renamed to correspond to physical registers. The method then proceeds to block 1208 in which the operands are checked for dependencies with all execution queues. Method 1200 proceeds to decision diamond 1210 in which, for each execution queue, it is determined if there is a match (i.e. if there is an instruction already present in the queue on which an operand of the currently decoded instruction depends). If not, method 1200 proceeds to block 1218 in which the decoded instruction is dispatched to an independent execution queue. That is, the decoded instruction may be issued to an empty queue, if one is available, or to a queue with the fewest entries. The method then ends at end 1238. Referring back to decision diamond 1210, method 1200 proceeds to both decision diamonds 1212 and 1222.

At decision diamond 1212, it is determined if the match which was determined at decision diamond 1210 is with an instruction that is in a same-type queue. A same-type queue indicates that the currently decoded instruction and the instruction on which it depends (with which it matched) may be selected for execution from the same type queue. For example, both a load instruction and an add instruction can be selected for execution from any of the load queues. However, a complex instruction cannot be selected for execution from the load queues since a complex integer execution arbiter and execution unit is not coupled to the load queues. If, at decision diamond 2012, the match is not with the same-type queue, the method proceed to block 1218. If, at decision diamond 1212, the match is with the same-type queue, method 1200 proceeds to decision diamond 1214 in which it is determined if more than 1 match occurred. If not, then the currently decoded instruction is only dependent on one other instruction, and the method proceeds to block 1216 in which the currently decoded instruction is saved to the dependent queue (the queue which contains the instruction on which it depends). If, at decision diamond 1214, the count match is greater than 1, meaning that more than one match occurred, the method proceeds to block 1220. In block 1220, the duplicate/triplicate algorithm is used to save the instruction to multiple dependent queues by using the duplicate bits. That is, as described above in reference to the examples of FIGS. 6-13, if an instruction is saved to two dependent queues, a single bit location of duplicate free list 203 and the corresponding single bit in the duplicate fields of the duplicate instructions saved into the queues is used to keep track of the duplicate instructions. Similarly, if an instruction is saved to three dependent queues, 3 bit locations of duplicate free list 203 and the same corresponding 3 bit locations in the duplicate fields of the triplicate instructions saved into the queues is used to keep track of the triplicate instructions. As described above, for each triplicate instruction, only 2 bits of the 3 bit locations is asserted so that each of the three instructions has a different 3 bit value. The duplicate fields are used to process the instructions when they reach the bottom entry of a queue, as was described above, until only one of the duplicate instructions remains in the execution queue. It is the remaining instruction which becomes a valid instruction which can be selected for execution (e.g. the addc RC and add RF instructions of FIG. 9 or the load RG instruction of FIG. 13). Method 1100 then ends at end 1238.

Referring back to decision diamond 1222, if the match at decision diamond 1222 was not with an other-type queue, method 1200 proceeds to end 1238. However, if the match at decision diamond 1222 occurred with an other-type queue, then method 1200 proceeds to block 1226. For example, as described above in reference to FIG. 12, a load instruction (such as load RG) may include a dependency on a complex integer instruction which is in an other-type queue. The other-type queue refers to a queue which cannot be used for the decoded instruction. For example, the complex integer queue is an other-type queue for the load instruction since the load instruction cannot be selected for execution from the complex integer queue. At block 1226, a duplicate bit is assigned to the sync instruction. That is, an available bit location of duplicate free list 203 is selected to keep track of a sync instruction. The method proceeds to block 1228 in which the sync instruction (which corresponds to the decoded issued instruction) is saved in to the other-type queue, and the corresponding bit location of the sync_duplicate field is set to a logic level 1. Note that the actual instruction corresponding to the sync instruction, i.e. the decoded instruction, is also saved to a same-type queue either in block 1218, 1216, or block 1220 depending on whether matches exist with a same-type queue. Method 1200 then proceeds to decision diamond 1230 in which it is determined whether the decoded instruction matches with another other-type queue. If not, then method 1200 proceeds to block 1236 in which the SYNC_PENDING bit of PEND field 302 is set to a logic level 1 for the actual instruction which was saved into a same-type queue. Also, the 1-HOT sync_duplicate bit is also set to a logic level 1. That is, the corresponding bit location corresponding to the bit location of duplicate free list selected in block 1226 in the sync_duplicate field of the actual instruction is also set to a logic level 1. For example, referring to the example of FIGS. 12 and 13, the actual load RG instruction is saved to two same-type queues (queues 208 and 210) and a load sync dummy instruction is saved to the other-type queue (the complex integer queue, in this example). Also, bit location 5 of sync_duplicate fields 702 and 710 (and of the sync_duplicate field of the load sync dummy instruction) are set to a logic level 1. The method then ends at end 1238.

Referred to decision diamond 1230, if another match with an other-type queue exists, method 1200 proceeds to decision diamond 1232. If there are more than 3 matches with other-type queues, method 1200 proceeds to block 1240 in which the instruction is stalled and the method returns to block 1202. If, at decision diamond 1232, the match count is 3 or less, then method 1200 proceeds to block 1234 in which the duplicate/triplicate algorithm is used to save a sync instruction to multiple dependent queues using the duplicate bits, similar to what was described above with respect to block 1220. Note also that the sync_duplicate fields of each of the duplicate or triplicate sync instructions will be set accordingly as well. For example, as described above with respect to the multiply dummy sync instruction in FIG. 10 or the load RG instruction in FIG. 12, those instructions which are dummy sync instructions or have a corresponding dummy sync instruction can be duplicated or triplicated as well in which the sync_duplicate fields are used to keep track of the syncing of instructions and the duplicate fields are used to keep track of the instruction duplication. The method then proceeds to block 1236, described above.

Figure 17:
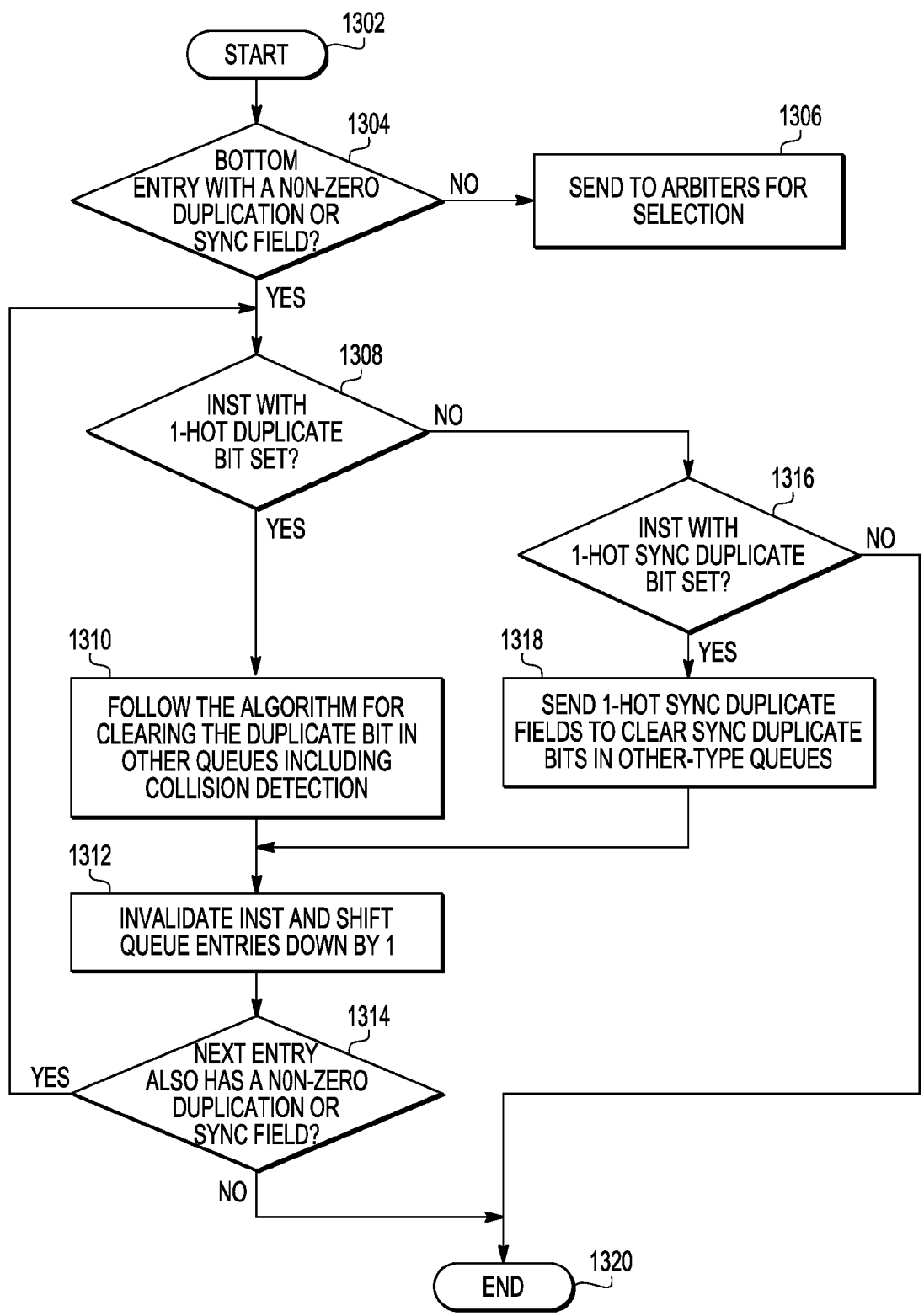
FIG. 17 is a flow diagram of an embodiment of a method for processing a bottom entry of an instruction queue the data processor of FIG. 2.

FIG. 17 illustrates, in flow diagram form, a method 1300 for processing an instruction at a bottom entry of an execution queue in accordance with one embodiment. Method 1300 begins with start 1302 and proceeds to decision diamond 1304 in which it s determined whether an instruction at a bottom entry of an execution queue has a non-zero duplicate field or sync field. If both fields are zeros (if both fields are clear), then method 1300 proceeds to block 1306 in which the instruction is a valid instruction read for selected for execution by an arbiter. In this case, note that any bit locations of duplicate free list 203 which corresponded to the duplicate or sync fields of this instruction will have been reset back to a logic level one. In this manner, note that an instruction is ready for execution only after any bit locations of duplicate free list 203 which corresponded to this instruction have been reset to a logic level one. If either the duplicate field or sync field is non-zero, then method 1300 proceeds from decision diamond 1304 to decision diamond 1308 in which it is determined whether the instruction has a 1-HOT duplicate bit set (whether the instruction has a non-zero duplicate field). If so, then the duplicate instruction is processed and the method proceeds to block 1310 in which the algorithm for clearing the duplicate bit in other queues is followed, including collision detection. For example, as described above with respect to the Addc in FIG. 8, or the load RG in FIG. 12, the duplicate fields are used to clear the corresponding bit in other duplicate fields of instructions in other queues. Also, if the instruction at the bottom entry of the execution queue is also stored in a bottom entry of another of the execution queues, then the instruction stored in the bottom entry of the execution queue which has the lower priority is invalidated. That is, the instruction stored in the bottom entry of the higher-order execution queue is the one that is processed. At decision diamond 1308, if the duplicate field is zero, method 1300 proceeds to decision diamond 1316 in which it is determined whether the instruction has a 1-HOT sync duplicate bit set. If not, the method ends at end 1320. However, if so, the method proceeds to block 1318 in which the sync_duplicate field is used to clear the appropriate bit locations in the sync_duplicate bits on other-type queues. The method then proceeds to block 1312. Note that, in the current embodiment, the check for a non-zero duplicate field occurs prior to the check for a non-zero sync_duplicate field. That is, in the current example, the duplicate field takes precedence and is processed prior to the sync_duplicate field.

At block 1312, the instruction is invalidated and the queue entries are shifted down by 1. That is, an instruction at the bottom entry of a queue with a non-zero duplicate field or non-zero sync_duplicate field is not ready for selection for execution and is thus invalidated and removed from the queue. In the case of a non-zero duplicate field, there are 1 or 2 remaining instances of the instruction in another (same-type) queue. In the case of a non-zero sync_duplicate field, there is still 1 or 2 remaining instances of the actual instruction in either a same-type queue or other-type queue. For example, queue 210 in the examples of FIGS. 8, 10, and 12 all provide examples of how instructions with non-zero duplicate fields and/or non-zero sync_duplicate fields are invalidated and processed. Method 1300 then proceeds to decision diamond 1314 in which it is determined whether the next instruct also has a non-zero duplicate or sync_duplicate field. If so, the method returns to decision diamond 1308 in which this next instruction is processed as described above. If not, the method ends at end 1320. Therefore, as in the examples of queue 210 in FIGS. 8, 10, and 12, multiple instructions can be invalidated and processed in a single cycle. Also, if at decision diamond 1316, the instruction does not have a 1-HOT sync_duplicate bit set, the method also ends at end 1320.

Therefore, by now it can be understood how a single duplicate free list can be used to keep track of a variety of dependencies and complexities present in various execution queues. For example, a single duplicate free list can be used to keep track of both duplicate and triplicate instructions, dummy sync instructions, as well as status bit using or generating instructions. In this manner, additional data storage can be avoided and increased instruction execution efficiency may be achieved.

Note that the functionality of all or a portion of methods 1000, 1100, 1200, and 1300 may be executed by logic instructions executable by processor 102.

The terms "assert" or "set" and "negate" (or "deassert", or "clear") have been used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes, in a processor having an instruction unit, a decode/issue unit, and execution queues configured to provide instructions to correspondingly different types execution units, a method including maintaining a duplicate free list for the execution queues, wherein the duplicate free list includes a plurality of duplicate dependent instruction indicators that indicate when a duplicate instruction for a dependent instruction is stored in at least one of the execution queues; assigning one of the duplicate dependent instruction indicators to an execution queue for a dependent instruction; and executing the dependent instruction only when the one of the duplicate dependent instruction indicators is reset. Item 2 includes the method of item 1, wherein a first set of the duplicate dependent instruction indicators correspond to duplicate dependent instruction indicators for instructions whose operands depend on a result of another instruction, and a second set of the duplicate dependent instruction indicators correspond to duplicate synchronization instruction indicators for instructions whose operands depend on a result of another instruction of a different type, and the method further includes, when the operands of a received instruction of a first type depend on another instruction of a second type in one of the execution queues, assigning one of the plurality of duplicate dependent instruction indicators to the received instruction, and storing a synchronization instruction and a duplicate synchronization instruction indicator corresponding to the assigned duplicate dependent instruction indicator in the one of the execution queues of the second type. Item 3 includes the method of item 2 and further includes, when the operands of the received instruction of the first type depend on the instruction of the second type in one of the execution queues, if the operands of the received instruction depend on a third instruction stored in the execution queues, and the received instruction is a different type than the third instruction: assigning one or more of the plurality of duplicate dependent instruction indicators to the received instruction; and storing a second synchronization instruction, a second duplicate synchronization instruction indicator, and a duplicate instruction indicator in one of the execution queues that includes the third instruction, wherein each of the second duplicate synchronization instruction indicator and the duplicate instruction indicator correspond to the assigned one or more duplicate dependent instruction indicators. Item 4 includes the method of item 2, and further includes, when the operands of the received instruction of the first type depend on more than one instruction of the first type in more than one of the execution queues, assigning one or more of the plurality of duplicate dependent instruction indicators to the received instruction, and storing the received instruction and a duplicate instruction indicator corresponding to the assigned one or more duplicate dependent instruction indicators in the execution queues that include the instructions on which the operands of the received instruction depend. Item 5 includes the method of item 2, and further includes, if the operands do not depend on any instruction stored in the execution queues, storing the received instruction in one of the execution queues that is characterized as an independent execution queue. Item 6 includes the method of item 2, and further includes, if a valid instruction stored in a bottom entry of an execution queue includes a duplicate instruction indicator that is set or a duplicate synchronization instruction indicator that is set, if the duplicate instruction indicator is set, sending a signal based on the duplicate instruction indicator to clear duplicate instruction indicators in other execution queues corresponding to the instruction stored in the bottom entry, if the instruction stored in the bottom entry of the execution queue is also stored in a bottom entry of another one of the execution queues, invalidating the instruction stored in the bottom entry of the execution queue if the other one of the execution queues is a higher-order execution queue than the execution queue, and shifting entries in the execution queue down by one instruction. Item 7 includes the method of item 6, and further includes, if a valid instruction stored in a bottom entry of an execution queue includes a duplicate instruction indicator that is set or a duplicate synchronization instruction indicator that is set, if the duplicate instruction indicator is not set, if the duplicate synchronization instruction indicator is set, sending a signal based on the duplicate synchronization instruction indicator to clear duplicate synchronization instruction indicators in other execution queues corresponding to the instruction stored in the bottom entry, and shifting the entries in the execution queue down by one instruction. Item 8 includes the method of item 1, wherein a first set of the duplicate dependent instruction indicators correspond to duplicate instruction indicators for instructions whose operands depend on a result of another instruction, and a second set of the duplicate dependent instruction indicators correspond to duplicate status bit indicators for the instructions whose operands depend on the result of the other instruction, and wherein the method further includes, when a received instruction will update a status bit, assigning one of the plurality of duplicate dependent instruction indicators to the received instruction, storing the received instruction and a duplicate status bit indicator corresponding to the assigned duplicate dependent instruction indicator to one of the execution queues, setting a status pending indicator corresponding to the assigned duplicate dependent instruction indicator, and setting a pending valid indicator in the decode/issue unit. Item 9 includes the method of item 8, and further includes, when the received instruction will use the status bit, when the pending valid indicator is set for the status pending indicator, assigning the status pending indicator to the received instruction; storing the received instruction and the assigned status pending indicator to one of the execution queues; when the pending valid indicator is not set for the status pending pointer, reading the status pending indicator from a status register for the received instruction. Item 10 includes the method of item 8, and further includes, when an instruction is at a bottom entry of an execution queue and selected for execution, when a status write pending indicator is set, sending a signal based on a duplicate status bit indicator for the instruction selected for execution to clear duplicate status bit indicators for duplicate instructions in the other execution queues, when the status bit indicators for the duplicate instructions are cleared, resetting status pending indicators for the duplicate instructions. Item 11 includes the method of item 10, and further includes, when the instruction at a bottom entry of an execution queue is selected for execution, when the status write pending indicator is set, sending another signal based on the duplicate status bit indicator for the instruction selected for execution to clear a bit in the status pending indicator, when all bits in the status pending indicator are cleared, resetting the pending valid indicator.

Item 12 includes a processing system including a processing unit; an instruction unit; a decode/issue unit; execution queues configured to provide instructions to correspondingly different types execution units; and logic instructions operable to maintain a duplicate free list for the execution queues, wherein the duplicate free list includes a plurality of duplicate dependent instruction indicators that indicate when a duplicate instruction for a dependent instruction whose operands depend on a result of another instruction is stored in at least one of the execution queues; assign one of the duplicate dependent instruction indicators to an execution queue for a dependent instruction; and execute the dependent instruction only when the one of the duplicate dependent instruction indicators is reset. Item 13 includes the processing system of item 12, wherein a first set of the duplicate dependent instruction indicators corresponds to duplicate dependent instruction indicators for instructions whose operands depend on a result of another instruction, and a second set of the duplicate dependent instruction indicators correspond to duplicate synchronization instruction indicators for instructions whose operands depend on a result of another instruction of a different type, and wherein the processing system further includes logic instructions operable to determine when the operands of a received instruction of a first type depend on another instruction of a second type in one of the execution queues, assign one of the plurality of duplicate dependent instruction indicators to the received instruction, and store a synchronization instruction and a duplicate synchronization instruction indicator corresponding to the assigned duplicate dependent instruction indicator in the one of the execution queues of the second type. Item 14 includes the processing system of item 13, and further includes logic instructions operable to determine when the operands of the received instruction of the first type depend on the instruction of the second type in one of the execution queues, determine if the operands of the received instruction depend on a third instruction stored in the execution queues, and the received instruction is a different type than the third instruction: if the operands of the received instruction depend on a third instruction stored in the execution queues, and the received instruction is a different type than the third instruction: assign one or more of the plurality of duplicate dependent instruction indicators to the received instruction; and store a second synchronization instruction, a second duplicate synchronization instruction indicator, and a duplicate instruction indicator in one of the execution queues that includes the third instruction, wherein each of the second duplicate synchronization instruction indicator and the duplicate instruction indicator correspond to the assigned one or more duplicate dependent instruction indicators. Item 15 includes the processing system of item 12, and further includes logic instructions operable to if an instruction stored in a bottom entry of an execution queue includes a duplicate instruction indicator that is set or a duplicate synchronization instruction indicator that is set, if the duplicate instruction indicator is set, send a signal based on the duplicate instruction indicator to clear duplicate instruction indicators in other execution queues corresponding to the instruction stored in the bottom entry, if the instruction stored in the bottom entry of the execution queue is also stored in a bottom entry of another one of the execution queues, invalidate the instruction stored in the bottom entry of the execution queue if the other one of the execution queues is a higher-order execution queue than the execution queue, and shift entries in the execution queue down by one instruction; if the duplicate instruction indicator is not set, if the duplicate synchronization instruction indicator is set, send a signal based on the duplicate synchronization instruction indicator to clear duplicate synchronization instruction indicators in other execution queues corresponding to the instruction stored in the bottom entry, and shift the entries in the execution queue down by one instruction. Item 16 includes the processing system of item 12, wherein a first set of the duplicate dependent instruction indicators correspond to duplicate instruction indicators for instructions whose operands depend on a result of another instruction, and a second set of the duplicate dependent instruction indicators correspond to duplicate status bit indicators for the instructions whose operands depend on the result of the other instruction, and wherein the processing system further includes logic instructions operable to determine that a received instruction will update a status bit, assign one of the plurality of duplicate dependent instruction indicators to the received instruction, store the received instruction and a duplicate status bit indicator to one of the execution queues, and setting a status pending indicator corresponding to the assigned duplicate dependent instruction indicator, and set a pending valid indicator in the decode/issue unit. Item 17 includes the processing system of item 16, and further includes logic instructions operable to determine that the received instruction will use the status bit, when the pending valid indicator is set for the status pending indicator, assign the status pending indicator to the received instruction; store the received instruction and the assigned status pending indicator to one of the execution queues; when the pending valid indicator is not set for the status pending pointer, read the status pending indicator from a status register for the received instruction. Item 18 includes the processing system of item 16, and further includes logic instructions operable to determine when an instruction at a bottom entry of an execution queue is selected for execution, when a status write pending indicator is set, send a signal based on a duplicate status bit indicator for the instruction selected for execution to clear duplicate status bit indicators for duplicate instructions in the other execution queues, when the status bit indicators for the duplicate instructions are cleared, clear status pending indicators for the duplicate instructions, send another signal based on the duplicate status bit indicator for the instruction selected for execution to clear a bit in the status pending indicator, when all bits in the status pending indicator are cleared, reset the pending valid indicator.

Item 19 includes a processing system including a processing unit; an instruction unit; a decode/issue unit; execution queues configured to provide instructions to correspondingly different types execution units; a first set of the duplicate dependent instruction indicators correspond to duplicate instruction indicators for instructions whose operands depend on a result of another instruction; and a second set of the duplicate dependent instruction indicators correspond to one of the group consisting of: duplicate status bit indicators for the instructions whose operands depend on the result of the other instruction, and duplicate synchronization instruction indicators for instructions whose operands depend on a result of another instruction of a different type, and logic instructions operable to determine when one of the duplicate dependent instruction indicators in the first or second sets is assigned to an execution queue for a dependent instruction, the dependent instruction is executed only when the one of the duplicate dependent instruction indicators is reset. Item 20 includes the processing system of claim 19, and further includes logic instructions operable to determine when the operands of a received instruction of a first type depend on another instruction of a second type in one of the execution queues, assign one of the plurality of duplicate dependent instruction indicators to the received instruction, and store a synchronization instruction and a duplicate synchronization instruction indicator corresponding to the assigned duplicate dependent instruction indicator in the one of the execution queues of the second type; and logic instructions operable to determine that a received instruction will update the status bit, assign one of the plurality of duplicate dependent instruction indicators to the received instruction, store the received instruction and a duplicate status bit indicator corresponding to the assigned duplicate dependent instruction indicator to one of the execution queues, setting a status pending indicator corresponding to the assigned duplicate dependent instruction indicator, and set a pending valid indicator in the decode/issue unit.

What is claimed is:

1. In a processor having an instruction unit, a decode/issue unit, and execution queues configured to provide instructions to correspondingly different types execution units, a method comprising:
   maintaining a duplicate free list for the execution queues, wherein the duplicate free list includes a plurality of duplicate dependent instruction indicators that indicate when a duplicate instruction for a dependent instruction is stored in at least one of the execution queues;
   assigning one of the duplicate dependent instruction indicators to an execution queue for a dependent instruction; and
   executing the dependent instruction only when the one of the duplicate dependent instruction indicators is reset.

2. The method of claim 1, wherein a first set of the duplicate dependent instruction indicators correspond to duplicate dependent instruction indicators for instructions whose operands depend on a result of another instruction, and a second set of the duplicate dependent instruction indicators correspond to duplicate synchronization instruction indicators for instructions whose operands depend on a result of another instruction of a different type, the method further comprising:
   when the operands of a received instruction of a first type depend on another instruction of a second type in one of the execution queues,
      assigning one of the plurality of duplicate dependent instruction indicators to the received instruction, and
      storing a synchronization instruction and a duplicate synchronization instruction indicator corresponding to the assigned duplicate dependent instruction indicator in the one of the execution queues of the second type.

3. The method of claim 2, further comprising:
   when the operands of the received instruction of the first type depend on the instruction of the second type in one of the execution queues,
      if the operands of the received instruction depend on a third instruction stored in the execution queues, and the received instruction is a different type than the third instruction:
         assigning one or more of the plurality of duplicate dependent instruction indicators to the received instruction; and
         storing a second synchronization instruction, a second duplicate synchronization instruction indicator, and a duplicate instruction indicator in one of the execution queues that includes the third instruction, wherein each of the second duplicate synchronization instruction indicator and the duplicate instruction indicator correspond to the assigned one or more duplicate dependent instruction indicators.

4. The method of claim 2, further comprising:
   when the operands of the received instruction of the first type depend on more than one instruction of the first type in more than one of the execution queues,
      assigning one or more of the plurality of duplicate dependent instruction indicators to the received instruction, and
      storing the received instruction and a duplicate instruction indicator corresponding to the assigned one or more duplicate dependent instruction indicators in the execution queues that include the instructions on which the operands of the received instruction depend.

5. The method of claim 2, further comprising:
   if the operands do not depend on any instruction stored in the execution queues, storing the received instruction in one of the execution queues that is characterized as an independent execution queue.

6. The method of claim 2, further comprising:
   if a valid instruction stored in a bottom entry of an execution queue includes a duplicate instruction indicator that is set or a duplicate synchronization instruction indicator that is set,
      if the duplicate instruction indicator is set,
         sending a signal based on the duplicate instruction indicator to clear duplicate instruction indicators in other execution queues corresponding to the instruction stored in the bottom entry,
         if the instruction stored in the bottom entry of the execution queue is also stored in a bottom entry of another one of the execution queues,
            invalidating the instruction stored in the bottom entry of the execution queue if the other one of the execution queues is a higher-order execution queue than the execution queue, and
            shifting entries in the execution queue down by one instruction.

7. The method of claim 6, further comprising:
if a valid instruction stored in a bottom entry of an execution queue includes a duplicate instruction indicator that is set or a duplicate synchronization instruction indicator that is set,
if the duplicate instruction indicator is not set,
if the duplicate synchronization instruction indicator is set,
sending a signal based on the duplicate synchronization instruction indicator to clear duplicate synchronization instruction indicators in other execution queues corresponding to the instruction stored in the bottom entry, and
shifting the entries in the execution queue down by one instruction.

8. The method of claim 1, wherein a first set of the duplicate dependent instruction indicators correspond to duplicate instruction indicators for instructions whose operands depend on a result of another instruction, and a second set of the duplicate dependent instruction indicators correspond to duplicate status bit indicators for the instructions whose operands depend on the result of the other instruction, the method further comprising:
when a received instruction will update a status bit,
assigning one of the plurality of duplicate dependent instruction indicators to the received instruction,
storing the received instruction and a duplicate status bit indicator corresponding to the assigned duplicate dependent instruction indicator to one of the execution queues,
setting a status pending indicator corresponding to the assigned duplicate dependent instruction indicator, and
setting a pending valid indicator in the decode/issue unit.

9. The method of claim 8, further comprising:
when the received instruction will use the status bit,
when the pending valid indicator is set for the status pending indicator,
assigning the status pending indicator to the received instruction;
storing the received instruction and the assigned status pending indicator to one of the execution queues;
when the pending valid indicator is not set for the status pending indicator,
reading the status pending indicator from a status register for the received instruction.

10. The method of claim 8, further comprising:
when an instruction is at a bottom entry of an execution queue and selected for execution,
when a status write pending indicator is set,
sending a signal based on a duplicate status bit indicator for the instruction selected for execution to clear duplicate status bit indicators for duplicate instructions in the other execution queues,
when the status bit indicators for the duplicate instructions are cleared,
resetting status pending indicators for the duplicate instructions.

11. The method of claim 10, further comprising:
when the instruction at a bottom entry of an execution queue is selected for execution,
when the status write pending indicator is set,
sending another signal based on the duplicate status bit indicator for the instruction selected for execution to clear a bit in the status pending indicator,
when all bits in the status pending indicator are cleared,
resetting the pending valid indicator.

12. A processing system comprising:
a processing unit;
an instruction unit;
a decode/issue unit;
execution queues configured to provide instructions to correspondingly different types execution units; and
logic instructions operable to
maintain a duplicate free list for the execution queues, wherein the duplicate free list includes a plurality of duplicate dependent instruction indicators that indicate when a duplicate instruction for a dependent instruction whose operands depend on a result of another instruction is stored in at least one of the execution queues;
assign one of the duplicate dependent instruction indicators to an execution queue for a dependent instruction; and
execute the dependent instruction only when the one of the duplicate dependent instruction indicators is reset.

13. The processing system of claim 12, wherein a first set of the duplicate dependent instruction indicators corresponds to duplicate dependent instruction indicators for instructions whose operands depend on a result of another instruction, and a second set of the duplicate dependent instruction indicators correspond to duplicate synchronization instruction indicators for instructions whose operands depend on a result of another instruction of a different type, the processing system further comprising:
logic instructions operable to
determine when the operands of a received instruction of a first type depend on
another instruction of a second type in one of the execution queues,
assign one of the plurality of duplicate dependent instruction indicators to the received instruction, and
store a synchronization instruction and a duplicate synchronization instruction indicator corresponding to the assigned duplicate dependent instruction indicator in the one of the execution queues of the second type.

14. The processing system of claim 13, further comprising:
logic instructions operable to determine when the operands of the received instruction of the first type depend on the instruction of the second type in one of the execution queues,
determine if the operands of the received instruction depend on a third instruction stored in the execution queues, and the received instruction is a different type than the third instruction:
if the operands of the received instruction depend on a third instruction stored in the execution queues, and the received instruction is a different type than the third instruction:
assign one or more of the plurality of duplicate dependent instruction indicators to the received instruction; and
store a second synchronization instruction, a second duplicate synchronization instruction indicator, and a duplicate instruction indicator in one of the execution queues that includes the third instruction, wherein each of the second duplicate synchronization instruction indicator and the duplicate instruction indicator correspond to the assigned one or more duplicate dependent instruction indicators.

15. The processing system of claim 12, further comprising:
logic instructions operable to if an instruction stored in a bottom entry of an execution queue includes a duplicate instruction indicator that is set or a duplicate synchronization instruction indicator that is set,
if the duplicate instruction indicator is set,
send a signal based on the duplicate instruction indicator to clear duplicate instruction indicators in other execution queues corresponding to the instruction stored in the bottom entry,
if the instruction stored in the bottom entry of the execution queue is also stored in a bottom entry of another one of the execution queues,
invalidate the instruction stored in the bottom entry of the execution queue if the other one of the execution queues is a higher-order execution queue than the execution queue, and
shift entries in the execution queue down by one instruction;
if the duplicate instruction indicator is not set,
if the duplicate synchronization instruction indicator is set for,
send a signal based on the duplicate synchronization instruction indicator to clear duplicate synchronization instruction indicators in other execution queues corresponding to the instruction stored in the bottom entry, and
shift the entries in the execution queue down by one instruction.

16. The processing system of claim 12, wherein a first set of the duplicate dependent instruction indicators correspond to duplicate instruction indicators for instructions whose operands depend on a result of another instruction, and a second set of the duplicate dependent instruction indicators correspond to duplicate status bit indicators for the instructions whose operands depend on the result of the other instruction, the processing system further comprising:
logic instructions operable to determine that a received instruction will update a status bit,
assign one of the plurality of duplicate dependent instruction indicators to the received instruction,
store the received instruction and a duplicate status bit indicator to one of the execution queues, and
setting a status pending indicator corresponding to the assigned duplicate dependent instruction indicator, and
set a pending valid indicator in the decode/issue unit.

17. The processing system of claim 16, further comprising:
logic instructions operable to determine that the received instruction will use the status bit,
when the pending valid indicator is set for the status pending indicator,
assign the status pending indicator to the received instruction;
store the received instruction and the assigned status pending indicator to one of the execution queues;
when the pending valid indicator is not set for the status pending pointer,
read the status pending indicator from a status register for the received instruction.

18. The processing system of claim 16, further comprising:
logic instructions operable to determine when an instruction at a bottom entry of an execution queue is selected for execution,
when a status write pending indicator is set,
send a signal based on a duplicate status bit indicator for the instruction selected for execution to clear duplicate status bit indicators for duplicate instructions in the other execution queues,
when the status bit indicators for the duplicate instructions are cleared,
clear status pending indicators for the duplicate instructions,
send another signal based on the duplicate status bit indicator for the instruction selected for execution to clear a bit in the status pending indicator,
when all bits in the status pending indicator are cleared,
reset the pending valid indicator.

* * * * *